(12) United States Patent
DeLine et al.

(10) Patent No.: US 7,526,755 B2
(45) Date of Patent: *Apr. 28, 2009

(54) PLUG-IN PRE- AND POSTCONDITIONS FOR STATIC PROGRAM ANALYSIS

(75) Inventors: Robert Anthony DeLine, Seattle, WA (US); Manuel Alfred Fahndrich, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 912 days.

This patent is subject to a terminal disclaimer.

(21) Appl. No.: 10/681,759

(22) Filed: Oct. 8, 2003

(65) Prior Publication Data

US 2005/0081192 A1 Apr. 14, 2005

(51) Int. Cl.
*G06F 9/44* (2006.01)
(52) U.S. Cl. ................. 717/126; 717/116; 717/131
(58) Field of Classification Search .......... 717/128–135
See application file for complete search history.

(56) References Cited

U.S. PATENT DOCUMENTS

| | | | | |
|---|---|---|---|---|
| 6,128,774 | A | * | 10/2000 | Necula et al. ............... 717/146 |
| 6,230,314 | B1 | | 5/2001 | Sweeney et al. |
| 6,279,149 | B1 | | 8/2001 | Field et al. |
| 6,353,925 | B1 | * | 3/2002 | Stata et al. .................. 717/112 |
| 6,571,232 | B1 | * | 5/2003 | Goldberg et al. ............... 707/2 |

OTHER PUBLICATIONS

Thomas Ball, et al., Automatically Validating Temporal Safety Properties of Interfaces, PLDI 2001, pp. 1-10.

Chandrasekhar Boyapati, et al., Ownership Types for Safe Programming: Preventing Data Races and Deadlocks, OOPSLA '02, Nov. 4-8, 2002, Seattle, Washington.

William R. Bush, et al., A Static Analyzer for Finding Dynamic Programming Errors, Software Pracrtice & Experience, 2000, Mountain View, California.

Manuvir Das, et al., ESP: Path-Sensitive Program Verification in Polynomial Time, PLDI '02, Jun. 17-19, 2002, pp. 57-68, Berlin, Germany.

Robert DeLine, et al., Enforcing High-Level Protocols in Low-Level Software, PLDI 2001, Snowbird, Utah.

Robert DeLine, et al., The Fugue Protocol Checker: Is Your Software Baroque?, OOPSLA '03, 2003, pp. 1-15, Anaheim, California.

Manuel Fahndrich, et al., Adoption and Focus: Practical Linear Types for Imperative Programming, PLDI '02, Jun. 17-19, 2002, pp. 13-24, Berlin, Germany.

(Continued)

*Primary Examiner*—Michael J Yigdall
(74) *Attorney, Agent, or Firm*—Amin, Turocy & Calvin, LLP

(57) ABSTRACT

A system and method employing pre- and/or post-condition(s) specified at a source code level and persisted (e.g., in associated object code and/or a specification repository) facilitating static checking of the object code is provided. The system and method are based, at least in part, upon a framework that employs rules for using an interface to be recorded as declarative specifications in an existing language.

A specifier can give a method a plug-in pre- and postcondition, which is arbitrary code that examines an object's current state and a static approximation of the method's actuals, decides whether the call is legal and returns the object's state after the call.

23 Claims, 18 Drawing Sheets

OTHER PUBLICATIONS

Cormac Flanagan, et al., Extended Static Checking for Java, PLDI '02, Jun. 17-19, 2002, Berlin, Germany.

Cormac Flanagan, et al., Type-Based Race Detection for Java, PLDI 2000, Vancouver, British Columbia, Canada.

Jeffrey S. Foster, et al., Flow-Sensitive Type Qualifiers, PLDI '02, Jun. 17-19, 2002, pp. 1-12, Berlin, Germany.

Andrew D. Gordon, et al., Typing a Multi-Language Intermediate Code, ACM, 2001.

Seth Hallem, et al., A System and Language for Building System-Specific, Static Analyses, PLDI '02, Jun. 17-19, 2002, pp. 69-82, Berlin, Germany.

Erik Meijer, et al., Technical Overview of the Common Language Runtime, 2000.

C. C. Michael, et al., Improving Heuristic Software Analysis with Semantic Information, 2001, pp. 1-8.

John Penix, Rebound: A Framework for Automated Component Adaptation, 1998.

Sander Tichelaar, et al., A Meta-Model for Language-Independent Refactoring, Proceedings ISPSE 2000, IEEE, 2000, pp. 157-167.

Karl Crary et al., Typed Memory Management in a Calculus of Capabilities, Conference Record of the 26th Annual ACM SIGPLAN-SIGACT Symposium on Principles of Programming Languages, Jan. 1999, pp. 262-275, ACM Press.

Proceedings of the ACM SIGPLAN 2002 Conference on Programming Language Design and Implementation, Jun. 17-19, 2002, 326 pages.

Robert E. Strom et al., Typestate: A Programming Language Concept for Enhancing Software Reliability, IEEE Transaciotns on Software Engineering, Jan. 1986, pp. 157-171, vol. 12, Issue 1.

* cited by examiner

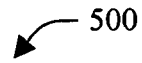

```
[WithProtocol(
        CustomState=typeof(SqlConnectionState)) ]
class SqlConnection
{
[ Creates,
 OutConnectionState(
        Status=ConnectionState.Closed,
        Host="", Database="")]
SqlConnection ();

[ Creates,
 OutConnectionState(
        Status=ConnectionState.Closed,
        StateProvider="NewHostAndDatabase"),
OutStateDependsOn("connectionString")]
SqlConnection (string connectionString) ;

[ OutConnectionState(
        Status=ConnectionState.Open) ]
void Open () ;
}
```

FIG. 5

```
[ WithProtocol(
        CustomStat=typeof(SqlCommandState)) ]
class SqlCommand
{
  [OutCommandState(
        StateProvider="UpdateCommandText"),
   OutStateDependsOn("cmdText") ]
  SqlCommand (string cmdText);

[ property: Transparent ]
  SqlConnection Connection { get; set; }

[ InCommandState(
        StateChecker="CheckCommandText"),
   InStateDependsOn("this.Connection") ]
  [ return: OutReaderState(
        StateProvider="GetColumnInfo"),
   OutStateDependsOn("this.Connection","this") ]
  SqlDataReader ExecuteReader ();
}
```

FIG. 6

```
{ WithProtocol(
        CustonState=typeof(sqlReaderState)) ]
class SqlDataReader
{
        [ InReaderState(
          StateChecker="ValidColumnName"),
          InStateDependsOn("name") ]
        object get_Item (string name);

[ InReaderState(
          StateChecker="ColumnIsString"),
          InStateDependsOn("i") ]
        string Getstring (int i);
}
```

FIG. 7

```
class SqlConnectionState : CustomState
{
        ConnectionState Status
        sting Host, Database;

void NewHostAndDatabase (string{} connString) {
        // Example plug-in postcondition, which
        // parses a connection string for
        // its host and database names.
        Regex hostRegex = new Regex (
                @"(data source|server)\s*=([^;]*)\b",
                RegexOptions.IgnoreCase);
        Regex dbRegex = new Regex(
                @"(catalog|database)\s*=([^;}*\b",
                RegexOptions.IgnoreCase);
        for (int i=0; i<connString.Length; i++) {
                MatchCollection dbm =
                   hostRegex.Matches(connString[i]);
                if (dbm.Count > 0)
                   Host = dbm[0] .Groups[2].Captures[0].Value;
                MatchCollection hm =
                   dbRegex.Matches(connString[i]);
                if (hm.Count > 0)
                   Database = hm[0].Groups[2].Captures[0].Value;
        }
        if (Host == null)
                Fail("could not find host");
        if (Database == null)
                Fail("could not find database");
        }
}
```

FIG. 8

```
class SqlCommandState : CustomState
{
        string[] CommandText;

void UpdateCommandText (string[] c0 { CommandText=c; } bool CheckCommandText (SqlConnectionState c) {
            return ISLegalSQL(CommandText, c.Host, c.Database);
        }
}
```

```
class SqlReaderState : CustomState
{
        string [] ColumnNames, ColumnTypes;

void GetColumnInfor (SqlConnectionState connection,
                             SqlComandState command) {...}
        bool ValidColumnName (string[] name) {...}
        bool ClumnIsString (int i) {...}
}
```

0  s : ref($a_0$)
1  enc : ref($a_1$)
2  stack0 : calue(int, 256, default)
3  buf : value(byte[], ·, default)
4  bytes : value(int, ·, default)
5  stack0 : value(int, 0, default)
6  page : ref($a_3$)
7  stack0 : value(int, 0, default)
8  stack0 : value(bool, ·, default)
9  (no change)
10 bytes : value(int, ·, default)
11 stack0 : value(int, 0, default)
12 stack0 : ref($a_4$)
13 (no change)
14 (no change)
15 (no change)

$a_0 \rightarrow$ (Socket.NotAliased, "connected", 0)
$a_1 \rightarrow$ (Encoding.MayBeAliased/Escaping, default, 0)

$a_3 \rightarrow$ (string.MayBeAliased/Escaping, default, 0)

$a_4 \rightarrow$ (string.MayBeAliased/Escaping, default, 0)

($a_0$ removed from capabilities)

1200

```
[WithProtocol( UnknownDB, KnownDB)]
class Publications : System.Web.UI.Page
{
  [InConnectionState(WhenEnclosingState=UnknownDB
    Status = ConnectionState.Closed,
    Host = AnyHost, Database = AnyDatabase)
   InConnectionState(WhenEnclosingState=KnownDB
    Status = ConnectionState.Closed,
    Host = XXX, Database = YYY )
  private SqlConnection m_sqlCn;

[ChangesState( UnknownDB , KnownDB )]
private void OnPageLoad (EventArgs e)
{
  m_sqlCn = new SqlConnection(...);
  //...
}

[InState( KnownDB )]
void WriteTRDetail ()
{
   m_sqlCn.Open();
   SqlCommand objCommand =
       new SqlCommand("EXEC ...", m_sqlCn);
   SqlDataReader objDataReader =
    objCommand.ExecuteReader();
   // ...
}
}
```

```
string GetPersonWebURL (
  [ InReaderState(
    ColumnNames = - "internalurl", "externalurl" ",
    ColumnTypes = - "nchar", "nchar" " ]
  SqlDataReader dr )
{
  if (dr["internalurl"] = = null)
    if (dr["externalurl"] = = null)
      return "";
    else
    // ...
}
```

PLUG-IN PRE- AND POSTCONDITIONS FOR STATIC PROGRAM ANALYSIS

TECHNICAL FIELD

The present invention relates generally to static checking of object code, and, more particularly, to a system and method employing plugin pre- and/or postcondition(s) facilitating static checking of the object code.

BACKGROUND OF THE INVENTION

Computers operate under the control of a program consisting of coded, executable instructions. Typically, a program is first written as a textual representation of computer-executable instructions in a high-level language, such as BASIC, Pascal, C, C++, C#, or the like, which are more readily understood by humans. A file containing a program in high-level language form is known as source code. The high-level language statements of the source code are then translated or compiled into the coded instructions executable by the computer. Typically, a software program known as a compiler is used for this purpose.

Generally, the source code of a programming language is formed of program constructs organized in one or more program units, such as procedures, functions, blocks, modules, projects, packages and/or programs. These program units allow larger program tasks to be broken down into smaller units or groups of instructions. High-level languages generally have a precise syntax or grammar, which defines certain permitted structures for statements in the language and their meaning.

A compiler is a computer program that translates the source code, which is written in a high-level computer programming language that is easily understood by human beings, into another language, such as object code executable by a computer or an intermediate language (IL) (e.g., Common Intermediate Language (CIL)) that requires further compilation to be executable. Typically, a compiler includes several functional parts. For example, a conventional compiler may include a lexical analyzer that separates the source code into various lexical structures of the programming language, known as tokens, such as may include keywords, identifiers, operator symbols, punctuation, and the like.

A typical compiler also includes a parser or syntactical analyzer, which takes as an input the source program and performs a series of actions associated with the grammar defining the language being compiled. The parser typically builds an Abstract Syntax Tree (AST) for the statements in the source program in accordance with the grammar productions and actions. For each statement in the input source program, the parser generates a corresponding AST node in a recursive manner based on relevant productions and actions in the grammar. Parsers typically apply rules in either a "top-down" or a "bottom-up" manner to construct an AST. The AST is formed of nodes corresponding to one or more grammar productions. The parser performs syntactical checking, but usually does not check the meaning (or the semantics) of the source program.

A typical parser also may create a Name List table (also called a "symbol table") that keeps track of information concerning each identifier declared or defined in the source program. This information includes the name and type of each identifier, its class (variable, constant, procedure, etc.), nesting level of the block where declared, and other information more specific to the class.

After the source program is parsed, it is input to a semantic analyzer, which checks for semantic errors, such as the mismatching of types, etc. The semantic analyzer accesses the Name List table to perform semantic checking involving identifiers. After semantic checking, the compiler generates an Intermediate Representation (IR) from which an executable format suitable for the target computer system is generated.

However, because conventional compiler(s) do not check protocol(s) for interface(s), even in a safe programming language, such as C# or Java, disobeying the rules for using an interface can cause exception(s) at run time. Such rules govern how system resources are managed, the order of method calls, and the formatting of string parameters, such as SQL queries and XML element tags.

Conventional checker(s) typically trace the flow of values in the code and compute a set of properties/relations of these values. At particular points in the program under analysis, these checker(s) check certain condition(s) using the computed properties, such as that a parameter is not null etc. Programmer(s) have a difficult time extending these conventional checker(s), since the properties they trace are essentially pre-defined.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method employing plug-in pre- and/or postcondition(s) facilitating static checking of object code.

In accordance with an aspect of the present invention, the system tracks property(ies) not traced by conventional program checker(s) as a user (e.g., programmer/specifier) can define a "custom state". A custom state is a class implemented by the programmer/specifier that contains information that statically approximates certain property(ies) of the program values in the program under analysis.

For example, the programmer/specifier can place annotation(s) in the a program to be checked and interfaces invoked by the system to be checked that specify plugin-post condition(s). These post condition(s) have the effect of injecting the custom state of the programmer into the property(ies) the checker traces and propagates.

Yet another aspect of present invention provides for the programmer/specifier to annotate the program to be checked and interfaces the program to be checked invokes with plugin-preconditions. When the checker analyzes a call to a method with a plugin precondition, the checker has traced the custom state (injected earlier) to this call site. The checker then invokes the plugin-precondition, which is arbitrary code written by the programmer/specifier, and passes to this plugin the custom state traced by the checker.

Thus, once a programmer/specifier has written a custom state class, plugin-preconditions/post conditions, and annotated an interface, for example "J", with the plugin-pre conditions/post conditions, then other programmers writing a program "B" invoking code in interface J can have their code checked by the checker against the error(s) modeled by the custom state.

Accordingly, in accordance with an aspect of the present invention, an executable code check system can include an input component that receives executable code (e.g., object code) and associated specification(s), the specification(s) including information associated with a plug-in condition (e.g., precondition and/or postcondition) for a method. The executable code (e.g., object code) and specification(s) are then provided to a checker. The checker employs the specification to facilitate static checking of the object file. The checker provides information if a fault condition (e.g., error(s)) is determined to exist.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 5 is a listing of an exemplary class in accordance with an aspect of the present invention.

FIG. 6 is a listing of an exemplary class in accordance with an aspect of the present invention.

FIG. 7 is a listing of an exemplary class in accordance with an aspect of the present invention.

FIG. 8 is an exemplary protocol associated with the exemplary class of FIG. 5 in accordance with an aspect of the present invention.

FIG. 9 is an exemplary protocol associated with the exemplary class of FIG. 6 in accordance with an aspect of the present invention.

FIG. 10 is an exemplary protocol associated with the exemplary class of FIG. 7 in accordance with an aspect of the present invention.

FIG. 12 is a program listing illustrating the typing environment and capabilities for each line in the CFG of FIG. 11 in accordance with an aspect of the present invention.

FIG. 14 is an exemplary program listing illustrating relation between class states to field states in accordance with an aspect of the present invention.

DETAILED DESCRIPTION OF THE INVENTION

Figure 1:
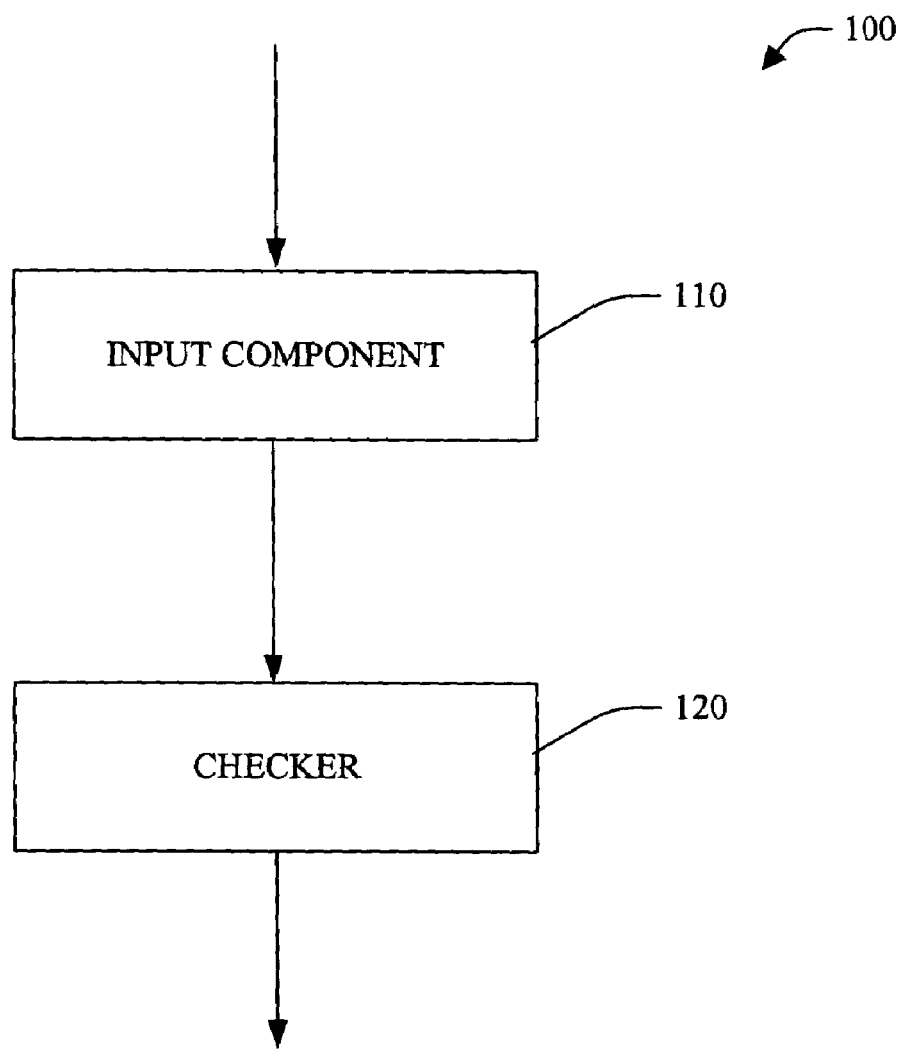
FIG. 1 is a block diagram of an executable code check system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers. Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Referring to FIG. 1, an executable code check system 100 in accordance with an aspect of the present invention is illustrated. The system 100 facilitates static checking of executable code (e.g., object code) through the use of plugin precondition and/or postcondition(s).

Many programming languages, for example C# and Java, catch or prevent many programming error(s) through compile-time checks and/or automatic memory management; however, there remain many programming errors that are not caught until run time, for example: forgetting to release a resource, such as a file or network connection; using a resource after release; calling methods in the wrong order; and/or typographical error(s) in literals that represent dynamic content (e.g., a string that contains a SQL query). Such programming error(s) can cause run-time exception(s), which can be experienced by the software's customers, if the error(s) are not noticed during testing.

Conventional checker(s) typically trace the flow of values in the code and compute a set of properties/relations of these values. At particular points in the program under analysis, these checker(s) check certain condition(s) using the computed properties, such as that a parameter is not null etc. Programmer(s) have a difficult time extending these conventional checker(s), since the properties they trace are essentially pre-defined.

The system 100 tracks property(ies) not traced by conventional program checker(s) as a user (e.g., programmer/specifier) can define a "custom state". A custom state is a class implemented by the programmer/specifier that contains information that statically approximates certain property(ies) of the program values in the program under analysis.

For example, the programmer/specifier can place annotation(s) in the program to be checked and interfaces invoked by the system 100 to be checked that specify plugin-post condition(s). These post condition(s) have the effect of injecting the custom state of the programmer into the property(ies) a checker 120 traces and propagates.

Yet another aspect of present invention provides for the programmer/specifier to annotate the program to be checked and interfaces the program to be checked invokes with plugin-preconditions. When the checker 120 analyzes a call to a method with a plugin precondition, the checker 120 has traced the custom state (injected earlier) to this call site. The checker 120 then invokes the plugin-precondition, which is arbitrary code written by the programmer/specifier, and passes to this plugin the custom state traced by the checker. Thus, once a programmer/specifier has written a custom state class, plugin-preconditions/post conditions, and annotated an interface, for example "J", with the plugin-pre conditions/post conditions, then other programmers writing a program "B" invoking code in interface J can have their code checked by the checker 120 against the error(s) modeled by the custom state.

The system 100 thus facilitates separation of error checking concerns.

Conventional checker(s) checker trace value(s)/property(ies) in the program according to the program semantics. It knows nothing about the meaning of custom states or what the plugin pre/post conditions actually do. The plugin/pre/post conditions and the custom state are not concerned with how values are traced in the program under analysis. Thus, writers of custom state and plugin pre/post conditions can focus on the sole properties they are trying to model.

In one example, in order to mitigate run-time exception(s) of conventional system(s), the present invention (e.g., system 100) can employ a framework for declaration of precondition(s) and/or postcondition(s). The precondition and/or postcondition specification(s) can include, for example, rule(s) for using an interface, system resource management, order of method call(s) and/or formatting of string parameters. Thus, the system 100 can mitigate run-time exception(s) associated with conventional system(s), such as exception(s) associated with improper-management of system resource(s), order of method calls and/or formatting of string parameter(s) (e.g., SQL queries).

The declaration framework allows rule(s) for using an interface to be recorded as declarative specification(s) and provides a range of annotations that allow a developer to specify interface rule(s) with varying precision. At the simplest end of the range, a specifier can mark those method(s) that allocate and release resource(s). A specifier can also limit the order in which an object's methods may be called to the transitions of a finite state machine. At the more complex end of the range and in accordance with an aspect of the present invention, a specifier can give a method a plug-in pre- and postcondition—code (e.g., arbitrary) that examines an object's current static state and a static approximation of the method's actuals, decides whether the call is legal and returns the object's state after the call.

In one example, source code for a software component is created (e.g., by a developer) employing the framework for declaration of a plug-in condition (e.g., precondition(s) and/or postcondition(s)) specification(s) at the source code level in accordance with the present invention. The source code is then compiled into executable code (e.g., object code) with the plug-in condition (e.g., precondition and/or postcondition) specification(s) being embedded within the executable (e.g., object code). The executable code (e.g., object code) with embedded specification(s) is received by an input component 110 of the system 100. The executable code (e.g., object code) with embedded specification(s) is provided to the checker 120. The checker 120 employs the specification to facilitate static checking of the object file. The checker 120 provides information (e.g., to the developer) if a fault condition (e.g., error(s)) is determined to exist. Once the system 100 has employed the embedded specification, the embedded specification can, optionally, be removed from the executable code, thus, reducing the overall physical storage requirements associated with the executable code.

The static checking which the checker 120 performs can, for example, relate to error(s) that involve disobeying rule(s) for using an interface, called the interface's protocol. Conventionally, interface protocols are typically recorded in informal documentation, where they are not useful for systematic checking. The declaration framework facilitates a software checker that allows interface protocol(s) to be specified as annotations in a library's source code and/or in a specification repository. Thus, the system 100 can check that client code using an interface obeys the interface's protocol and/or that the interface's implementation is consistent with its protocol. For example, the checker 120 can perform a static, modular analysis to produce information associated with fault condition(s), for example, a list of error message(s) and/or warning(s). The analysis performed by the checker 120 is static because it inspects the program's code, without any instrumentation to perform checks during execution. The analysis is modular because, at a method call site, the analysis inspects the callee's declaration and not its body.

For example, the checker 120 can analyze code created in language(s) that compile to the Common Language Runtime (e.g., C#, Visual Basic.net and/or Managed C++). While a modular analysis generally requires extra specification(s), the benefit is that, in one example, the analysis can be performed fast enough to be run after substantially every compilation.

Thus, the framework of the present invention allows programmer(s) to specify resource protocol(s) and state-machine protocol(s). For a resource protocol, the programmer specifies which method(s) allocate and/or release resource(s). Using these annotation(s), the checker 120 analyzes the code to ensure that, for substantially all path(s) in substantially every method, that (1) no resource is referenced after its release and that (2) substantially all resources are either released and/or returned to the caller.

In one example, a method M has a plug-in precondition Pre and a plug-in postcondition Post. For each call to M, the checker 120 invokes Pre and provides it with the program's approximate execution state at the call to M. Pre returns an indication of whether the call to M is legal. If the call is legal, the checker 120 invokes Post and provides it the program's approximate execution state at the call to M. Post returns the program's approximate execution state after the call to M and the checker 120 continues its analysis with the new approximate state. Additionally, plug-in pre- and postcondition(s) can, optionally, parse the contents of a query string and make that content available to the checker 120 as part of the program's approximate execution state. This allows the checker 120 to find defects in the query(ies).

For purposes of explanation, Table 1 illustrates an exemplary program that accesses file resources and the message produced by the checker 120 for the program:

TABLE 1

```
void CopyFile (string src, string dest)
{
    StreamReader fromFile = new StreamReader (src);
    StreamWriter toFile = new StreamWriter (dest);
    string line;
    while ((line=fromFile.ReadLine( )) != null)
        toFile.WriteLine(line);
    fromFile.Close( );
ERROR:  warning:  StreamWriter resource
    toFile becoming unreachable without
    calling StreamWriter.Close
}
```

The program allocates two file resources, but only explicitly releases one of them. As a result, the copied file may be truncated, since StreamWriter.Close flushes internal buffers. In this example, the checker 120 finds this error based, at least in part, upon the specifications associated with the exemplary program illustrated in Table 2:

TABLE 2

```
class StreamWriter
{
    [Creates]
    StreamWriter (string filename);
    [Disposes]
    void Close( );
}
```

Using a state-machine protocol, a programmer can constrain the order in which object's methods can be called to the transitions of a given state machine. The checker 120's analysis ensures that, for substantially all path(s) in substantially every method, the sequence of method calls on an object respect the object's state machine. Table 3 illustrates an exemplary program that employs sockets and a message that the checker 120 produces for this exemplary program.

TABLE 3

```
static public string DoSocketGet (string server)
ERROR:  cannot call Socket.Send because
s is state raw, but expected state
connected; did you forget to call Socket.Connect?
```

The program is meant to make method calls on a socket object in a particular order. In particular, in this example, Connect must be called before Send or Receive which this program neglects to do. Without correcting this error, at run time, the method Send throws the exception SocketException. The checker 120 finds this error because of the specifications shown in Table 5, set forth below.

In accordance with an aspect of the present invention, to check properties of method calls beyond ordering, the system 100 allows a more complex form of state-machine protocol. Rather than modeling an object's state with a symbol like "raw" or "ready", the system 100 allows the state of an object to be modeled with another object, called its "custom state". With simple state-machine protocols, the programmer specifies a method's precondition state (the symbolic state the object must be in to call the method) and/or postcondition state (the symbolic state the object is in after the method returns). Instead, with custom states, the programmer can assign a method a plug-in precondition and plug-in postcondition which are methods of the custom state object that are invoked during checking to perform interface-specific state checks and state transitions. An exemplary program using custom states and plug-in pre- and postconditions is set forth in Table 4:

TABLE 4

```
void UseADO ( ) {
    SqlConnection conn= new SqlConnection(
        "Server=localhost ; Database=Northwind");
    SqlCommand cmd = new SqlCommand(
        "SELECT OrderId, CustomerName FROM Orders");
    cmd.Connection = conn;
    conn.Open( );
    SqlDataReader reader = cmd.ExecuteReader( );
ERROR:   cannot call SqlCommand.ExecuteReader:
none of the tables in the SQL command has
a column named CustomerName ; did you mean CustomerID?
    while (reader.Read( )) {
        int ordered = (int) reader ["OrderIdd"];
ERROR: cannot call SqlDataReader indexer:
the reader has no column name OrderIdd ;
did you mean OrderID?
        string customer = reader.GetString(0);
ERROR: cannot call SqlDataReader.GetString:
database type int is not compatible with
program type System.String; consider calling
GetInt32 instead
        PrintOrder(ordered, Customer);
    }
//...
)
```

This exemplary program makes several errors while trying to read a relational database: it queries a nonexistent column in a table; it misspells a column name while reading the results of the query; and it tries to process the results of the query through an incompatible type. Table 4 further provides the three error messages the checker 120 produces on three consecutive runs, where the programmer corrects the previous error before the checker 120 produces the next message. At run time, these errors cause the program to throw the exceptions SqlException, IndexOutOfRangeException and InvalidCastException, respectively. The use of custom states and plug-in pre and postconditions, allows the programmer to extend the checker 120's general analysis with domain-specific algorithms (e.g., SQL parsing).

Specifications for Resource and/or State-Machine Protocols

This section describes exemplary specifications for resource and state-machine protocols, including custom states and plug-in pre- and postconditions. For the checker 120 to provide useful message(s) (e.g., as illustrated in Table 1, Table 3 and Table 4), the checker 120 requires specification(s) about which method(s) acquire and/or release resource(s) and/or the order in which method(s) are permitted to be called. Such specifications are a structured form of information that is often conventionally written in an unstructured way in comments and/or other documentation.

In accordance with an aspect of the present invention, specification(s) are written using a language feature, for example, "custom attributes", available with varying syntax in CLR language(s) and the like. Custom attributes are structured comments that persist into the CLR's object code. A custom attribute can include a name, plus zero or more positional and named parameters, whose values are limited to compile-time constants of a few basic types. Custom attributes can annotate any declaration, except local variables declarations.

Figure 2:
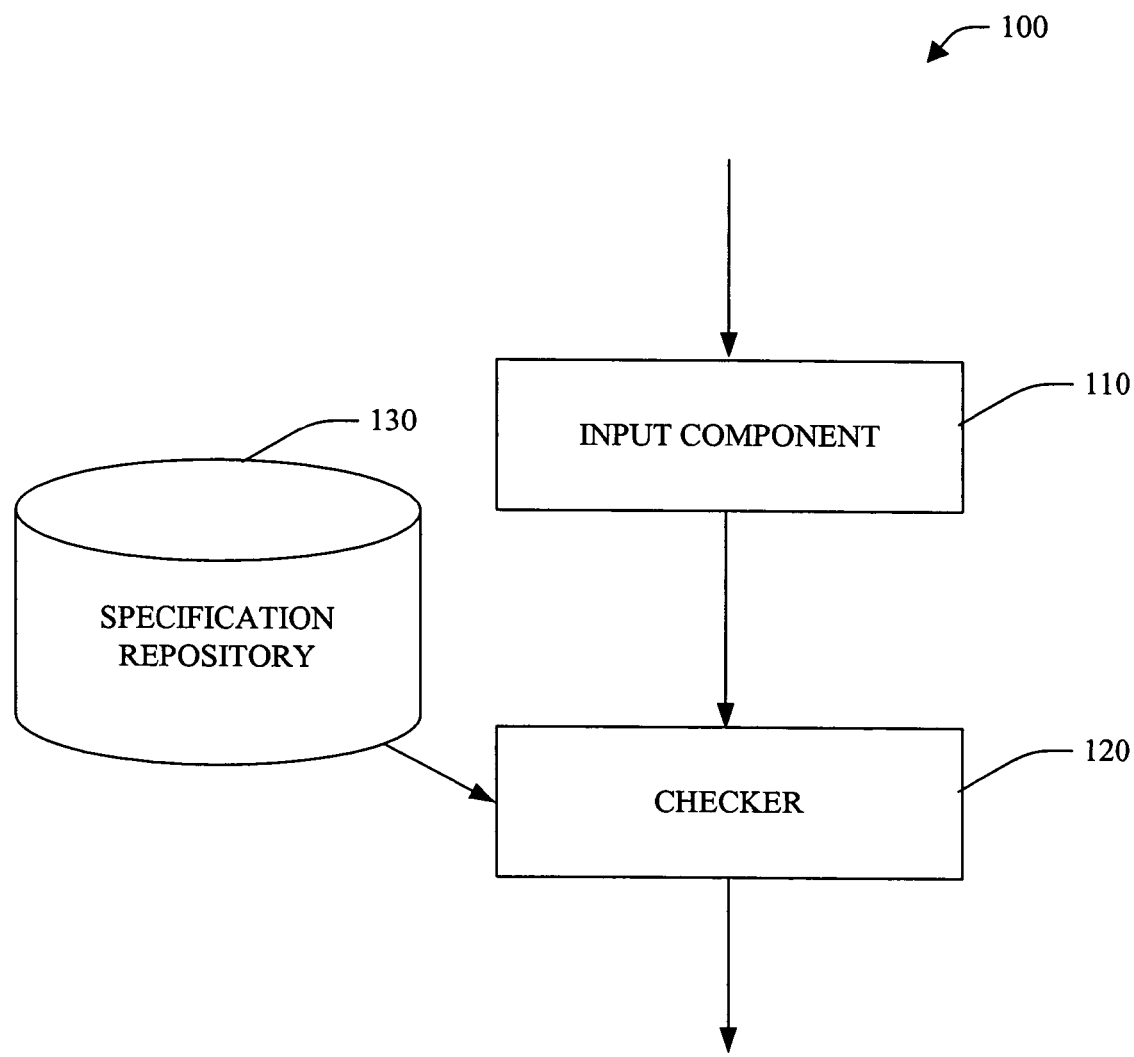
FIG. 2 is a block diagram of an executable code check system in accordance with an aspect of the present invention.

The checker 120 can either read custom attribute(s) from the object code on disk or from specification repository. Thus, as illustrated in FIG. 2, in one example, the system 100 includes an optional specification repository 130 to allow the annotation of library(ies) for which the developer does not control the source code or does not want the attribute(s) to appear in the object code. Although the checker 120 analyzes CLR object code, for readability, the examples described herein employ C# syntax, in which custom attributes are written in square brackets.

Resource Protocols

A "resource" is an object meant to be released through an explicit method call (e.g., a call to Close or Dispose rather than through garbage collection). In accordance with as aspect of the present invention, to specify a resource protocol, a developer marks those method(s) that allocate resource(s) with the "Creates" attribute and those that release resources with the "Disposes" attribute, or the like. Table 4 illustrates the two annotations that the checker 120 employs to produce the error message in Table 1. Given such annotations, the checker 120 ensures that, for substantially all paths in substantially every analyzed method, (1) no resource is referenced after its release and (2) all resources are either released or returned to the method's caller (e.g., "resource guarantee").

State-Machine Protocols

Figure 3:
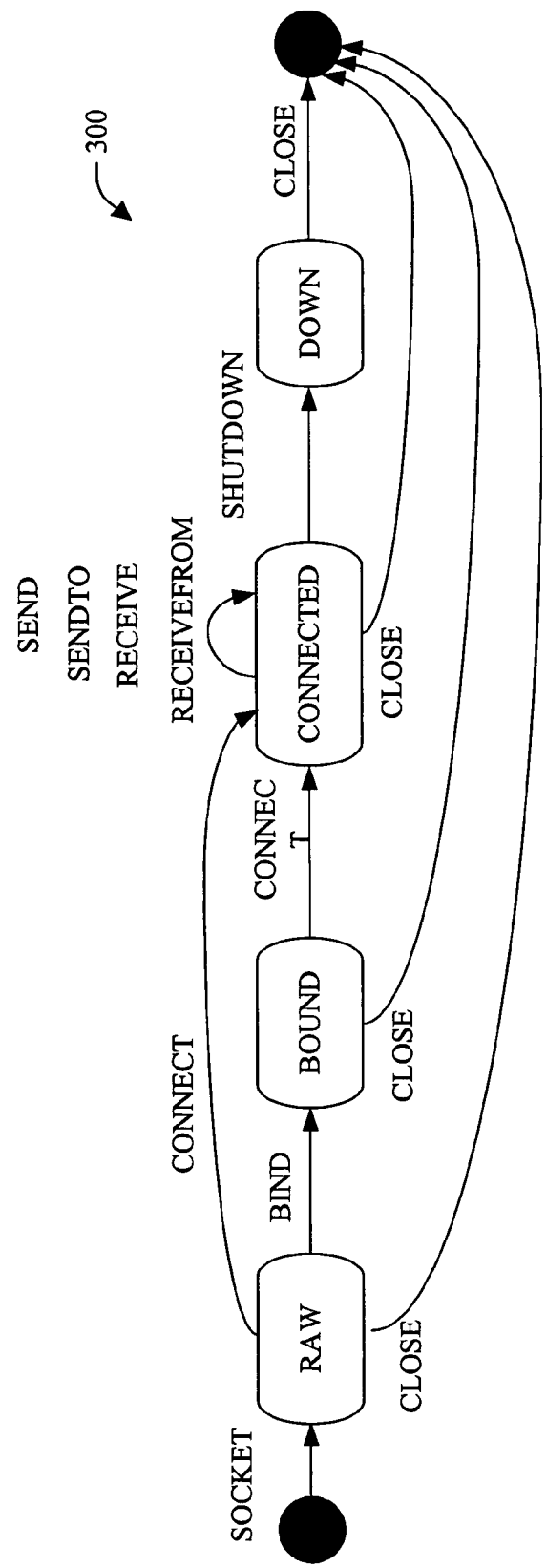
FIG. 3 is a block diagram of a state machine in accordance with an aspect of the present invention.

In addition to resource protocols, a specifier can constrain the order in which an object's methods may be called. Method order is constrained by specifying a finite state machine in which the states have symbolic names (e.g., arbitrary) and transitions between states are labeled with method names. For instance, the constraints can be modeled on the order of calling methods on a Socket object with the state machine 300 illustrated in FIG. 3. Table 5 illustrates the state-machine description illustrated in FIG. 3 can be captured as attributes in the declaration of class Socket:

TABLE 5

```
[WithProtocol (raw, bound, connected, down)]
class Socket
{ [Creates( raw)]
public Socket (...);
  [ChangesState(raw, bound)]
public void Bind (EndPoint localEP);
  [ChangesState( raw, connected),
ChangesState(bound, connected)]
public void Connect (EndPoint remoteEP);
  [InState( connected)]
public int Send (...);
  [InState( connected)]
public int Receive (...);
  [ChangesState( connected, down)]
public void Shutdown (SocketShutdown how);
  [Disposes(State.Any)]
public void Close ( );
}
```

For example, the checker 120 can employ this protocol to produce the error message in Table 3. The WithProtocol attribute specifies that a Socket resource can be in one of the four states "raw", "bound", "connected" or "down". As described above, the attributes Creates and Disposes mark those method(s) that respectively allocate and release Socket object(s). In this protocol, these attributes further specify the state in which the resource is allocated ("raw") and released (any of the four states). A method marked with ChangesState transitions the object between states, and one marked InState takes an object in the given state and leave it in that state. Given a class with a state-machine protocol, the checker 120 ensures that, for substantially all path(s) in substantially every analyzed method, the string of method calls made on an instance of that class is in the language that the finite state machine accepts (e.g., "method order guarantee").

Relating Object States to Field States

When both an object and its fields have state-machine protocols, the specifier can relate the state of an object to the state of its fields—referred to as "state mapping". Table 6 illustrates an exemplary class "WebPageFetcher" which fetches multiple web pages from a single connection to a server:

TABLE 6

```
[WithProtocol("open", "closed")]
class WegPageFetcher
{
  [InState("connected", WhenEnclosingState="open"),
  [NotAliased(WhenEnclosingState="open"),
  Unavailable(WhenEnclosingState="closed")]
  private Socket socket;
  [Creates("closed")]
  public WebPageFetcher ( ) { }
  [ChangesState("closed","open")]
  public void Open (string server)
  {
    Socket newSock = new Socket(
      AddressFamily.InterNetwork,
      SocketType.Stream, ProtocolType.Tcp);
    this.socket = newSock;
    IPAddress host =
  Dns.Resolve(server) .AddressList[0];
  socket.Connect(new IPEndPoint(host, 80));
  }
  [InState("open")]
  public string GetPage (string url)
  {
    this.socket.Send(
      Encoding.ASCII.GetBytes(
        "GET / HTTP/1.1 \ r \ nHost: " +
        server + " \ r \ nConnection: Close \ r \ n \
  r \ n"));
    //...
  }
  [ChangesState("open", "closed")]
  public void Close ( )
  {
  this.socket.Send(
    Encoding.ASCII.GetBytes("QUIT \ r \ n"));
  this.socket.Close( );
  }
}
```

Figure 4:
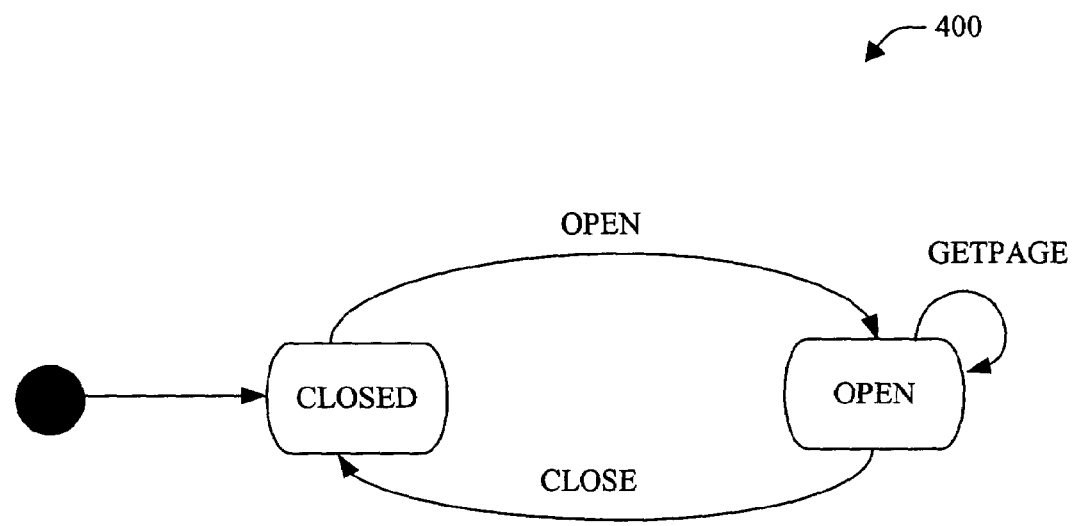
FIG. 4 is a block diagram of a state machine in accordance with an aspect of the present invention.

The attributes on WebPageFetcher limit method call order to the state machine 400 illustrated in FIG. 4. The annotation on its Socket field relates the symbolic state of a WebPageFetcher object to the symbolic state of the Socket field: when the WebPageFetcher is in state "open", its Socket field is in state "connected" and not aliased; when the WebpageFetcher is in state "closed", its Socket field is unavailable (e.g., has previously been disposed). The aliasing constraint is described in the next section.

When checking the body of a method, the checker 120 uses the method's specified pre-state to make assumptions about the states of the class's fields. For example, when checking the body of GetPage, the checker 120 uses the pre-state of the WebPageFetcher object ("open") and the state mapping to know that the socket field is in state "connected". Hence, the call to Send which requires the socket to be in state "connected", is legal. At the end of a method, the checker 120 ensures that the fields are in the appropriate states for the method's post-state. In summary, by giving class WebPageFetcher a state machine protocol, the checker 120 can ensure that a client of a WebPageFetcher object calls its methods in the appropriate order. By relating the states of the WebPageFetcher object to the states of its socket field, the checker 120 can further ensure that the implementation of WebPageFetcher itself is a well-behaved client of Socket's state-machine protocol.

Custom States

Instead of giving symbolic names to states, an equivalent alternative is to specify the states as objects whose fields are of the types that can be passed as attribute parameters. This object is called the class's "custom state" and its fields are called the custom state components. This alternative is useful as an abbreviation, for example, for an exponentially large set of states. For instance, several CLR libraries promote "form-based programming," in which an object's methods take few, if any, arguments and information is instead passed to the object through properties. A "property" is a field that is implemented as a pair of get/set methods. Table 7 illustrates a custom state employed in a socket's protocol:

TABLE 7

```
[WithProtocol(Custom state=typeof(ConnectionState))]
class NetworkConnection
    {
    string Host
        {
        [InConnectionState(HostSet=true)]
        get { /*...*/ }
        [InConnectedState(Connected=false),
    OutConnectionState(HostSet=true)]
        set { /*...*/ }
        }
    int Port
        {
        [InConnectionState(PortSet=true)]
        get { /*...*/ }
        [InConnectedState(Connected=false),
    OutConnectionState(PortSet=true)]
        set { /*...*/ }
        }
    [InConnectionState(Connected=false,
        HostSet=true, PortSet=true),
    OutConnectionState(Connected=true)]
        void Connect ( );
    }
    class ConnectionState
        {
        bool HostSet;
        bool PortSet;
        bool Connected;
        }
```

For example, a client can establish a network connection by setting properties of a NetworkConnect ion object:

```
NetworkConnection c = new NetworkConnection( );
c.Host = "www.microsoft.com";
c.Port = 8080;
c.Connect( );
```

In this example, the method Connect has a precondition that both the Host and Port properties must be set. Using a simple state-machine protocol to keep track of whether n properties have been set requires $2^n$ named states. Instead, a custom state with a boolean field per property to represent whether that property has been set is employed.

In Table 7, the class NetworkConnection's WithProtocol attribute does not list a set of symbolic state names, but rather refers to a class definition (ConnectionState) that implements the custom state. Class ConnectionState uses the fields HostSet and PortSet to represent respectively whether the properties Host and Port have been set and the field Connected to represent whether Connect has been called.

When a protocol uses symbolic states, the attributes ChangesState($S_1$,$S_2$) and InState(S) syntactically combine the object's pre- and post-states into a single attribute. Whereas, with custom states, the specifier uses separate attributes to specify an object's pre-state (InConnectionState) and post-state (OutConnectionState). These attributes take named parameters to specify the values of the custom state components. When a pre-state does not mention a state component, that component can have any value; when a post-state does not mention a state component, that component has the same value as in the pre-state. For instance, the precondition for Host's setter specifies that Connected must be false, but HostSet and PortSet can each be either true or false; the postcondition specifies that HostSet is true and Port Set and Connected have the same values as they did before the property setter call.

Domain-Specific Checks

When a class has a state-machine protocol, each of its methods specify a concrete pre-state and post-state. When checking a call to a method, the checker 120 uses a built-in precondition that tests the object's current state against the pre-state and a built-in postcondition that assigns the post-state to the object's current state. For a given method M these built-in pre- and postconditions can be replaced with plug-in pre and postconditions that the specifier provides.

A plug-in precondition is a method of the custom state class that returns a boolean. For every call to Min the code being checked, the checker 120 calls the plug-in precondition on the object's current state. If the plug-in precondition returns false, the checker 120 reports an error. A plug-in postcondition is a method of the custom state class that returns a custom state object. If the call to M upholds its precondition, the checker 120 calls the plug-in postcondition on the object's current state to compute the state of the object after the call to M.

For example, the plug-in pre and postconditions can be written in any CLR language and are invoked via reflection during checking. Because the plug-in pre- and postconditions are arbitrary code, the checker 120 cannot ensure what method order is allowed, as it can with state-machine protocols.

A specifier gives a method a plug-in precondition, for example, through the named parameter StateChecker in the method's pre-state attribute; similarly, the specifier gives a method a plug-in postcondition through the named parameter StateProvider in the method's post-state attribute. The value of either named parameter is a string that names a method of the appropriate type in the custom state class. In pre- and post-state attributes, it is legal both to specify some state components concretely and to provide a plug-in pre-or post-condition.

FIGS. 5, 6 and 7 illustrate three classes from a library for accessing relational databases (ado.net). The three library classes shown—SqlConnection 500 (FIG. 5), SqlCommand 600 (FIG. 6) and SqlDataReader 700 (FIG. 7) have protocols that use custom states and plug-in pre- and postconditions as illustrated in FIGS. 8, 9 and 10, respectively.

Referring briefly to FIGS. 5 and 8, the protocol 800 for the class SqlConnection models the state of a connection as a connection status (either Open or Closed) plus the names of the server and database that the connection accesses, represented respectively as the custom state components Status, Host and Database in the custom state class SqlConnectionState.

Next, turning to FIGS. 6 and 9, the class 900 for the class SqlCommand models the state of the command as its command text (e.g., a SQL query), represented by the custom state class SqlCommandState. Referring to FIGS. 7 and 10, the class 1000 for the class SqlDataReader models the state of the reader as the names and types of the columns that the reader accesses, represented by the custom state class SqlReaderState.

The state of an object often depends not only on the history of the method calls made on that object, but also on the actuals passed to those method calls. To accommodate this, the plug-in pre- and postconditions on a method M optionally take as parameters static approximations of the actuals passed to M at a given call site. To specify which actuals should be passed to a plug-in pre-or postcondition, the specifier uses the attributes InStateDependsOn and OutStateDependsOn, respectively. For instance, the plug-in postcondition NewHostAndDatabase takes an approximation of the actual connectionString as an additional parameter.

Within a method body, the checker 120 does a form of constant propagation on all values of a few basic types, for example, bool, int, string and enumerations. In one example, an actual to be passed to a plug-in pre-or postcondition must either be of one of these basic types, in which case the plug-in receives the static value of the actual, or must be an object with a protocol, in which case the plug-in receives the object's state.

In one example, at a given method call site, a plug-in pre-or postcondition can take an actual whose value is not statically known at that call site. In this case, for a plug-in precondition, the checker 120 issues a warning and treats the precondition as true. For a plug-in postcondition, the checker 120 issues a warning, assigns the object a state whose components have values denoting "unknown," and continues checking. If the developer is willing to change the program's source code, the checker 120 provides a way for the developer to provide a suggested static value for an expression whose value is not statically known as described more fully below.

For a value of type bool, int or an enumeration, the static approximation is either a constant or unknown. For a value of type string the value can be statically approximated as a "string with holes." For instance, if a method's actual is given by the string expression:

"SELECT Name FROM T WHERE Id="+id+"."

where id has an unknown value, the checker 120 models this string as the string array {"SELECT Name FROM T WHERE Id=", null "."}, where null encodes the "hole" in the string that stands for zero or more unknown characters. Thus, in FIG. 5, the parameter connectionString to NewHostAndDatabase has type string[ ] although the method's formal has type string.

In one example, implementation of a plug-in pre-or postcondition does not require any knowledge of the checker 120's implementation, including the checker 120's internal representation of the code. For instance, the plug-in postcondition NewHostAndDatabase whose code is shown in FIG. 8, parses a connection string, for example, "Server=Northwind; Database=localhost"to the custom state {Status=Closed; Host="localhost"; Database="Northwind"}, which only requires knowledge of the connection string's syntax. Similarly, referring to FIG. 10, GetColumnInfo parses SQL commands and returns column names and types. The checker 120 takes care of analyzing the flow of object states and values through the program's structure.

Heap Model and Checking Algorithm

This section provides an overview of how a checker can model the heap to track object identifies and employ that model to check code against protocol specification(s), and, is illustrative of how a checker can track the flow of value(s)/object(s) in a program.

In one example, the checker 120 analyzes CLR object code, which is expressed in the Common Intermediate Language (CIL). CIL is a conventional garbage-collected, object-oriented language with value types (integer and floating-point types of various widths and enumerations) and reference types (classes, interfaces and exceptions). A class contains fields, constructors and methods, has exactly one base class, and implements zero or more interfaces. As in C++, methods can be either virtual or non-virtual. The unit of software that the CLR loads is called an assembly which consists of external assembly references and class and interface definitions. CIL uses a stack machine model: instructions pop their operands off the evaluation stack and push their results onto the stack.

Aliasing

A problem in protocol checking is dealing with aliasing. As a simple example, the call sequence a.Open( ); b.Open( ) is legal only if variables a and b do not refer to the same object. In particular, for a modular protocol checker, a method's declaration advertises substantially all of the objects whose protocol states the method changes. Without this property, at a method call site, the checker 120 cannot know the post-states of the objects it is tracking, since any of them could have changed states as a result of the call.

To keep track of aliasing without doing a global alias analysis, the checker 120 provides the attributes NotAliasedand MayBeAliasedon field and parameter declarations. If a field or parameter is marked NotAliasedthen that field or parameter is the unique pointer to the object to which it refers. If a field or parameter is marked MayBeAliased then there may be arbitrarily many other pointers to the object to which the field or parameter refers. The checker 120 further distinguishes MayBeAliased parameters based on whether they are marked Escaping. A parameter escapes a method if the method assigns the parameter to a field, returns the parameter, or passes the parameter to another method as an Escaping parameter. By default, unannotated fields are considered MayBeAliased and unannotated parameters are considered MayBeAliased/Escaping.

In one example, the checker 120 employs a global escape analysis that marks parameters Escaping as appropriate. Given these attributes, the checker 120 enforces the following restrictions to ensure that there is always a unique reference to each NotAliased field and parameter: a NotAliased parameter or field can only be assigned to a local or to a NotAliased field or passed as a parameter marked NotAliased or MayBeAliased (non-Escaping; a MayBeAliased parameter or field can only be assigned to a local or to a MayBeAliased field or passed as a MayBeAliased parameter (Escaping or non-Escaping). When a method disobeys these restrictions, it creates a NotAliased field or parameter with arbitrarily many references, and the checker 120 warns that it is "losing track" of that field or parameter.

The NotAliased/MayBeAliased distinction directly supports sound, modular protocol checking. The checker 120 only allows an object marked NotAliased to be passed as a state-changing parameter to a method, for example, a parameter marked Disposes or ChangesState. Because the method uses attributes to advertise all protocol state changes and because the actual is NotAliased the checker 120 can be sure that the only object that the method affects is the actual. An object starts off as NotAliased at its constructor call site, where that constructor is marked Creates. To satisfy a Creates specification, a constructor cannot allow the this object to escape. A NotAliased object remains so until it is disposed, becomes unreachable, or the checker 120 loses track of it because it is passed as a MayBeAliased/Escaping parameter. The Escaping distinction allows simple inspection methods, like ToString and GetHashCode to be called on a NotAliased object without losing track of it.

The NotAliased, MayBeAliased and Escaping attributes convey aliasing information across method boundaries. Within a method body, the checker 120's analysis keeps track how locals, parameters, and fields alias objects, as discussed in the next section.

Heap Model

The checker 120's checking algorithm is a data flow analysis over a heap model consisting of a typing environment and a set of capabilities. The typing environment maps identifiers to a type description, which differs for value types and reference types. Value descriptors are tuples consisting of the underlying CLR type T; any literal value assigned to the identifier (for our constant propagation); and the state of the object to which the identifier refers. Reference descriptors consist only of a symbolic address for the object to which the identifier refers. The capabilities map from symbolic addresses to object descriptors. Object descriptors are tuples consisting of the underlying CLR type T; aliasing information (NotAliased, MayBeAliased, MayBeAliased/Escaping); the symbolic object state, plus an optional map of field names to symbolic addresses. If the map is absent, the field map can be created on demand from the class declaration and the symbolic state of the object.

```
env ::= id → typedesc
typedesc ::= valuedesc | refdesc
valuedesc ::= T xlit xstate
refdesc ::= ref(loc)
capabil ity ::= loc → objectdesc objectdesc ::= T xaliasdesc xstate xfieldmap
aliasdesc ::= NotAliased | MayBeAliased | MayBeAliased/Escaping
fieldmap ::= field → typedesc
```

The use of symbolic addresses provides a level of indirection that allows local aliasing information to be captured. For example, after the following two lines of code Socket sock1=new Socket( . . . )
Socket sock2=sock1;

the typing environment contains {sock1:ref(a); sock2:ref(a)} and the capabilities maps the symbolic address a to <Socket.NotAliased, "raw", 0>. That is, the typing environment and capabilities directly encode that sock1 and sock2 are aliases of the same object at address a.

The checker 120 can similarly track aliasing between fields and parameter/locals. Whenever the code contains an assignment to an object's field, the checker 120 updates the field information for the object to record the new object to which the field refers. For instance, after the first line of webPageFetcher. Open namely:

```
Socket newSock = new Socket(
    AddressFamily.InterNetwork,
    SocketType.Stream, ProtocolType.Tcp);
``` the typing environment contains {this:ref($a_0$); newSock: ref ($a_1$)} and the capabilities map:

```
a_0 → <WebPageFetcher, NotAliased, "closed", 0>.,
a_1 → <Socket.NotAliased, "raw", 0>.
```

After the next line of code:
this.socket=newSock;
the checker 120 updates the capabilities to:

```
a_0 → <WebPageFetcher.NotAliased, "closed", {socket → a_1 }>,
a_1 → <Socket, NotAliased, "raw", 0>.
```

That is, the typing environment and capabilities directly encode that this.socket and newSock alias the same object at address $a_1$.

Checking Algorithm

Given an assembly to check, the checker 120 iterates over the assembly's classes, first recording the annotations on each class's fields and then checking each of the class's methods in turn. For each method, the checker 120 builds a control flow graph (CFG) and simplifies the instructions by introducing locals to eliminate use of the evaluation stack. The new locals have names stack0, stack1, and so on up to the maximum stack depth that the method uses. In this canonicalized language, each block ends in a conditional branch, unconditional branch or return, and the instructions within a block are the following; several instructions due to call by reference and boxing and unboxing have been excluded for ease of explanation:

| | |
|---|---|
| v = literal | constant assignment |
| $v_1 = v_2$ | variable copy |
| $v_1 = v_2.f$ | field lookup |
| $v_1.f = v_2$ | field update |
| v = v[v] | array lookup |
| v[v = v | array update |
| v = unop v | unary operators |
| v = v binop v | binary operators |
| $v_1$ = new T [$v_2$] | array construction |
| v = new T ($v_i$) | object construction |
| v = call v, m ($v_i$) | non-virtual method call |
| v = callvirt v, m ($v_i$) | virtual method call |
| v = callstatic m ($v_i$) | static method call |

How each instruction affects the contents of the typing environment and capabilities is set forth below:

Method entry. The initial typing environment and capabilities are taken from the method's specification. The checker 120 adds a type descriptor to the typing environment for every parameter (including this) and takes the aliasing information and initial state from the parameter's attributes. If the parameter is a reference type, then an object descriptor for the symbolic address is added to the capabilities.

Constant assignment. The checker 120 updates the environment to map v to a new value descriptor denoting the literal value. The special value null denoting an absent object reference can, for example, be automatically converted to object descriptors where necessary.

Copy. The checker 120 updates the environment entry for $v_1$ with the current environment type descriptor of $v_2$.

Field lookup. The checker 120 looks up the reference descriptor ref(a) of variable $v_2$. If the capabilities don't contain a, the checker 120 reports a dangling reference access. Otherwise, the checker 120 updates the environment entry of $v_1$ with the type descriptor found for field in the field map of the object descriptor of a in the capabilities.

Field update. The checker 120 looks up the reference descriptor ref(a) of variable $v_1$. If the capabilities don't contain a, the checker 120 reports a dangling reference access. Otherwise, the field map of the object descriptor of a in the capabilities is updated to map field to the current type descriptor of variable $v_2$. Additionally, if the alias descriptor for a is MayBeAliased, the checker 120 checks that the type descriptor of $v_2$ is compatible with the field type descriptor of in the object state known of a. This ensures that type invariants of fields of aliased objects do not change.

Array lookup and update. In one example, the checker 120 does not support protocol checking on array elements. To decide the availability and state of a tracked element requires arithmetic reasoning which is undecidable in the general case. Hence, in this example, array elements are treated as MayBeAliased/Escaping. For elements of value type, the typing information is derived from the typing information for the array. For elements of reference type, a fresh address is created and added to the capabilities. References read or written to arrays must be in state default in this example.

Unary and binary operators. CIL unary and binary operators are defined over value types. The type of the result of the operator is given by the CIL language definition.

Array construction. The checker 120 adds a reference descriptor with a fresh symbolic address a to the environment for variable $v_1$ and add an object descriptor for a to the capabilities. The array object descriptor is always in state default. Object construction. The checker 120 creates a new symbolic address a for the constructed object and adds an object descriptor to the capabilities. The object descriptor (aliasing and state) is defined by the attributes on the called constructor.

Method call. For a method call, the checker 120 looks up the method's annotations and, for substantially every object passed as an actual, it ensures that the object has a type and state compatible with the formal's specification. For example, if a not-aliased object is passed to a formal with alias descriptor MayBeAliased/Escaping the checker 120 can report that it is "losing track" of the object.

If an actual has a plug-in precondition, the checker 120 calls it as part of checking whether the actual has the specified pre-state. If an actual does not have the specified pre-state, the checker 120 reports an error. Otherwise, the checker 120 updates the typing environment and capabilities based on the specified post-states of the parameters and return value. If an actual or return value's post-state has a plug-in postcondition, the checker 120 passes it the object's state recorded in the current capabilities to compute the object's post-state. If there is no plug-in precondition, the object's post-state is taken directly fro the specification.

When an object whose fields are described in the capabilities is passed as an actual, the checker 120 "packs" the object. To pack an object, the checker 120 first looks up whether the object has a protocol with a state mapping. If it does, the checker 120 looks up the field states that correspond to the pre-state that the method specifies. The checker 120 then checks that the actual's fields have the necessary field states. To finish packing, the checker 120 discards what is known about the object's fields from the capabilities, since the effects that a method has on its parameters' fields is not specified and therefore unknown. The exception is fields (or properties) marked as Transparent. A method may not update a Transparent field unless it specifies that it does so with the attribute Sets(field, parameter). The checker 120 updates Transparent fields on assignments and calls to methods with Sets attributes and does not discard information about Transparent fields as part of packing.

Method exit. After computing the data flow, the checker 120 checks that the typing environment and capabilities at the method's exit node is consistent with the method's specification.

Leak detection. After each instruction, the checker 120 checks if any symbolic addresses in the capabilities are unreachable from the environment. Unreachable object descriptors with NotAliased alias descriptors cause the checker 120 to issue a leak error. Otherwise, unreachable entries in the capabilities are garbage collected.

Checking a State-Machine Protocol Example

Table 8 illustrates a method that takes a Socket object in state "connected", uses it to receive data, then disposes of it.

TABLE 8

```
static public string ReadPage (
    [Disposes ("connected")] Socket s
)
{
    Encoding enc = Encoding.ASCII;
    byte[] buf = new byte[256];
    int bytes = s.Receive(buf);
    string page = enc(buf, 0, bytes);
    while (bytes > 0) {
        bytes = s.Receive(buf);
        page += enc.GetString(buf, 0, bytes);
    }
    s.Close( );
    return page;
}
```

Figure 11:
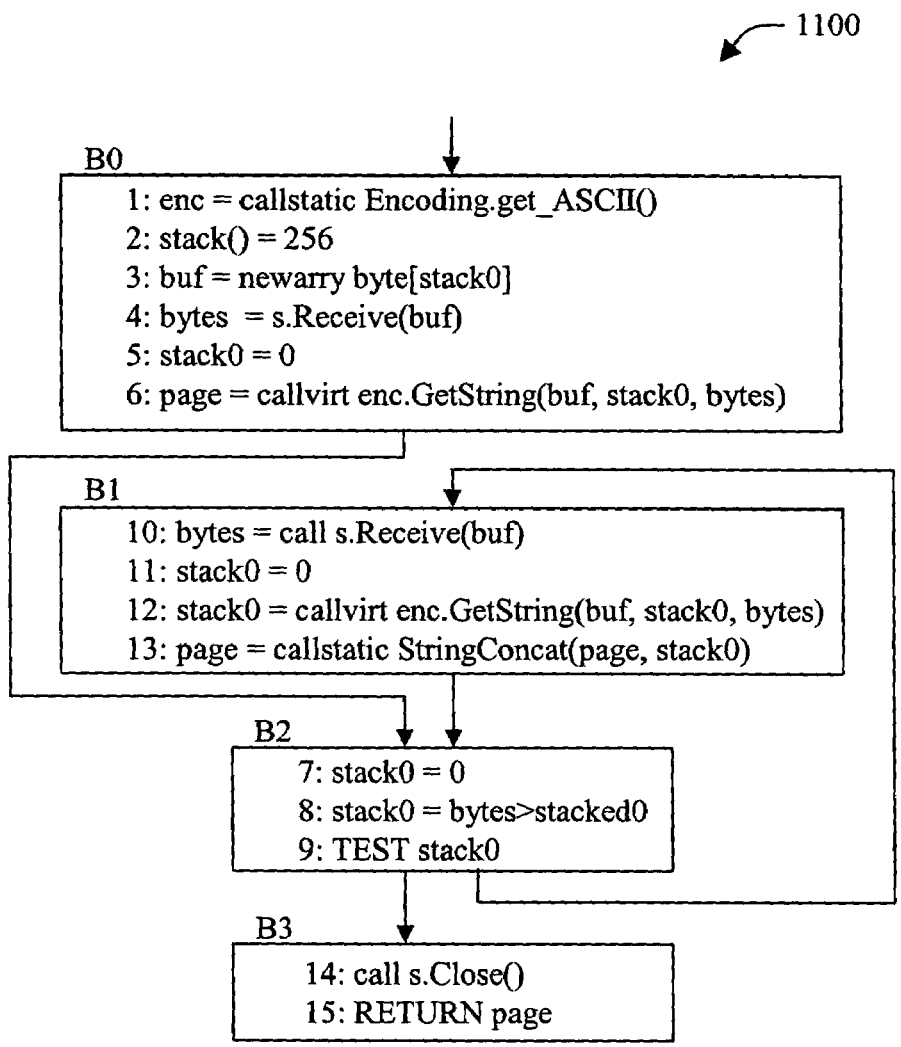
FIG. 11 is a control flow graph for the method set forth in Table 8 in accordance with an aspect of the present invention.

FIG. 11 illustrates a control flow graph 1100 (CFG) for the method set forth in Table 8 which uses the canonicalized instruction set. FIG. 12 illustrates the typing environment and capabilities 1200 that the checker 120 computes for each line in the CFG of FIG. 11. Line 0 is the initial typing environment and capabilities; the remaining rows of FIG. 12 depict the typing environment and capabilities after the given line of code has been analyzed. For ease of explanation, each row shows only the changes to the typing environment and capabilities from the previous row. For instance, after line 1, both s and enc are in the typing environment and both $a_0$ and $a_1$ are in the capabilities.

The initial typing environment contains only the parameter s whose aliasing information (NotAliased and state ("connected") are taken from its attribute Disposes ("connected"). At the end of the method, the checker 120 first checks that the method meets the specifications given by the attributes on the parameters and return value. In this case, to ensures's specification (Disposes), the checker 120 looks up s in the typing environment to find its symbolic address $a_0$ and ensures that $a_0$ is not in the final capabilities. Next, the checker 120 checks that none of the other symbolic addresses in the capabilities refer to NotAliased objects. In this case, $a_1$, $a_2$ and $a_3$ are all MayBeAliased/Escaping. Had any of them been NotAliased, the checker 120 would have reported a resource leak.

Checking the Example Program of Table 4

Referring back to the exemplary program illustrated in Table 4, the client shown in Table 4 accesses a database named "Northwind" served on the local machine. This database has a table named "Orders" whose columns include "OrderID" of database type int and "CustomerID" of database type nchar (string). In one example, the checker 120 checks the code in Table 4 line by line as follows:

Calling the SqlConnection constructor. The checker 120 calls the constructor's plug-in postcondition NewHostAndDatabase. This plug-in parses the connection string passed to the constructor to find the host and database names. After the constructor call, the state of the variable myConnection is {Status=Closed; Host="localhost"; Database="Northwind"}.

Calling the SqlCommand constructor. The checker 120 calls the constructor's plug-in postcondition UpdateCommandText. This plug-in sets the state component CommandText to the actual passed to the constructor. After this constructor call, the state of the variable cmd is {CommandText={"SELECT . . . Orders"}}.

Setting the Connection Property.

The next line sets cmds property Connection to the object myConnection. In CLR languages, a property is a field implemented as a pair of get and set methods, rather than as a memory cell. Because this property is specified as Transparent, the checker 120 statically tracks the object to which the property refers. Transparent fields and properties are discussed in the next section. The static value of the Connection property is later used when checking the call to ExecuteReader.

Calling Open. The call to Open changes conn's state to {Status=Open; Host="localhost"; Database="Northwind"}.

Calling ExecuteReader. The checker 120 first calls the method's plug-in precondition CheckCommandText. This method examines both the component CommandText from its own custom state and the components Host and Database from the custom state of its transparent property Connection. This plug-in precondition uses this host and database information to look up the database's schema in the checker 120's repository and checks that the SQL command is consistent with this schema. In the example code of Table 4, the programmer mistakenly typed CustomerName rather than CustomerId so CheckCommandText reports the error and returns false.

After this error has been corrected and the programmer re-runs the checker 120, the checker 120 next calls the plug-in postcondition GetColumnInfo on ExecuteReader's return value. This plug-in postcondition takes as parameters the custom state of the connection and command objects. It uses the connection object's host and database to look up the schema and records the names and (database) types of the columns returned fro the command object's command text. After the call to ExecuteReader the variable reader has state {ColumnNames={"OrderId", "CustomerId"}; ColumnTypes={"int", "nchar"}}.

Figure 13:
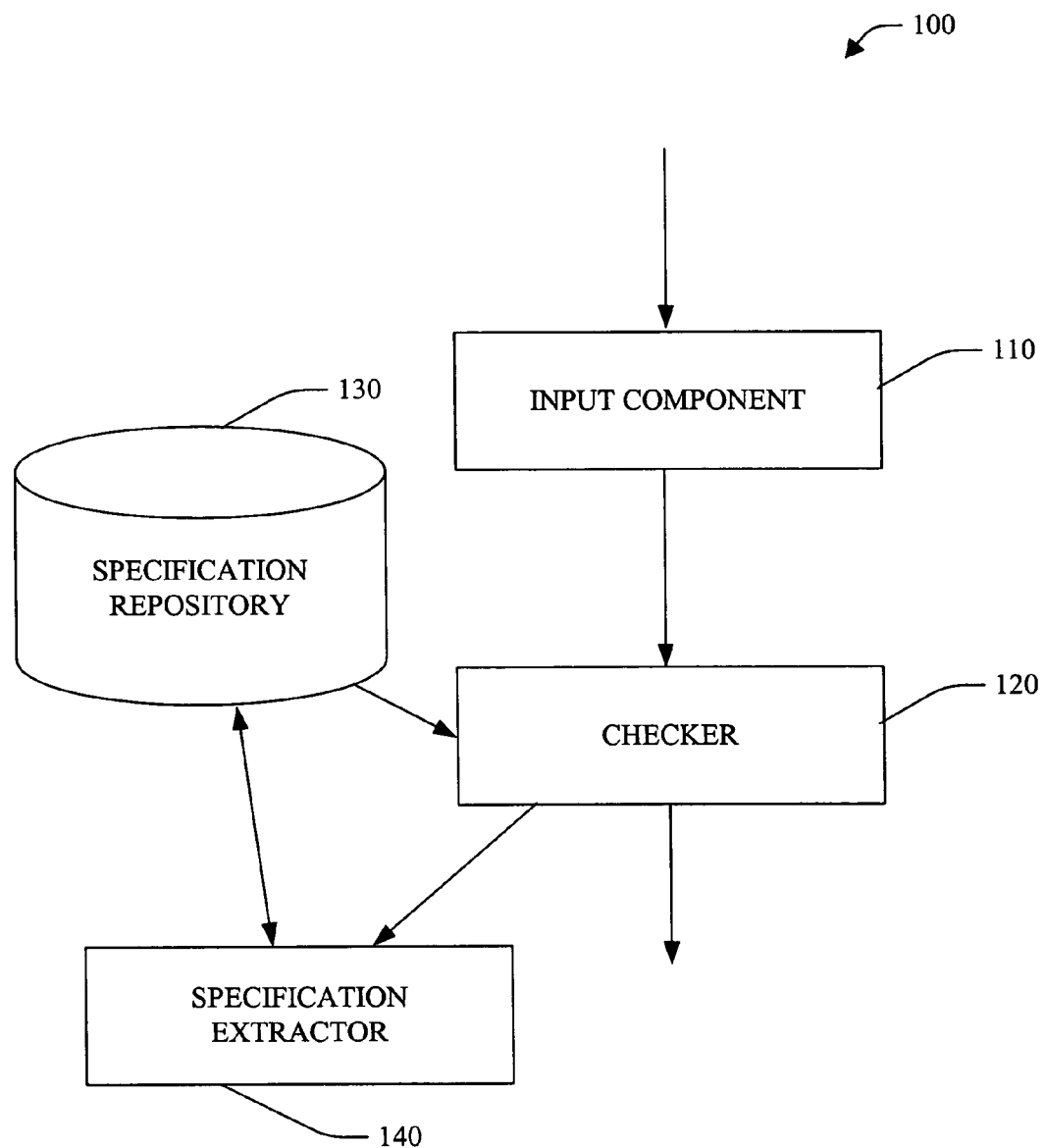
FIG. 13 is a block diagram of an executable code check system in accordance with an aspect of the present invention.

As illustrated in FIG. 13, in one example, the system 100 includes a specification extractor 140 that automatically queries a database for its schema and records that schema in the specification repository 130.

Calling get_Item. In the loop, the code first calls the method get_Item on object reader passing the string "OrderIdd" as the parameter. (C uses square brackets as syntactic sugar for a call to get_Item.) The checker 120 checks this method call by invoking get Items plug-in precondition ValidColumnName. This precondition checks that the actual column name is one of those in the custom state component ColumnNames. In this case, the name "OrderIdd" is not in the array ColumnNames so the plug-in reports an error and returns false.

Calling GetString. After this error has been corrected and the programmer re-runs the checker 120, the checker 120 next checks the call to GetString by calling its plug-in precondition ColumnIsString. This precondition ensures both that the given index is within range and that the given column's database type is compatible with the CLR type string. In this case, the zeroth column (OrderId) is of type int which is not compatible with string. The plug-in reports the error and returns false.

Results of Exemplary System Employed to Check Implementation of a Web Site

The system 100 was employed to check implementation of a web site which facilitates browsing of information stored in a relational database. The site's code is written in Visual Basic and compiles to a single assembly with approximately 16,000 lines of CIL code across 323 methods. The code has been well tested and deployed for about a year.

The system 100 was used to determine whether the assembly correctly uses ado.net. The code contains 17 different SQL queries that read the database. Of these queries, four are select queries and 13 are exec statements, which run procedures whose implementations are stored in the database itself. To support the ado.net plug-in pre and postconditions, a specification extractor 140 that queries a database for its schema and stores the result in the checker 120's specification repository 130 was utilized. For simple select statements, the tool automatically infers and records the structure of the data that the query returns. For stored procedures, the specification extractor 140 examines the procedures body. If the body is a simple select statement, the specification extractor 140 infers the structure of the result. Otherwise, the specification extractor 140 relies on the specifier to supplement by hand the information in the specification repository 130. Of the 13 exec statements in the checked assembly's code, four have procedure bodies that the specification extractor 140 cannot automatically specify.

Errors found. Several instances of two particular errors were found. First, in all 17 cases, the program neglects to dispose of the command object used to issue the query. Second, more seriously, in 9 cases, the program neglects to close a database connection after opening it and issuing a query. These errors are tolerable in a lightly trafficked intranet site, but would cause an extranet site to run out of resources.

Annotation burden. The WithProtocol attributes was added to three classes and protocol annotations to 24 methods and six fields in the Visual Basic source. Also, there are three methods whose use of ado.net is entirely local to the method and therefore did not need any annotations.

Figure 15:
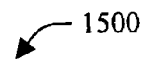
FIG. 15 is an exemplary program listing illustrating overriding of a method in accordance with an aspect of the present invention.

Keeping track of objects. With these annotations in place, the checker 120 did not issue a "losing track" message, and the proof obligations were all for simple inspection methods. The database connections, commands and readers are always used either entirely within a single method or across several methods of the same class. In the latter case, the ability to relate class states to field states allows the checker 120 to keep track of the objects. FIG. 14 illustrates an example relation between class states to field states. For consistency, FIGS. 14 and 15 are transliterated into C# syntax. The class Publications uses two symbolic states to distinguish whether its connection field has been initialized to refer to the appropriate database. Only when it has is it legal to call WriteTRDetail which issues a query.

Matching custom states. A custom state is implemented as a class whose base class is CustomStateAttribute which the checker 120 provides. This class has a virtual method Matches which most custom states will inherit without overriding, generally. The call $S_1$, Matches($S_2$) tests whether the custom state $S_1$ is acceptable in a context that expects custom state $S_2$. The default implementation of this method does a component-wise comparison of the two states, allowing any value for a component whose expected value is "unknown."

For one method in the case study, it was useful to override the Matches method for the SqlDataReaders custom state as illustrated in FIG. 15. This method assumes that the reader it is passed will have at least two string columns named "internalurl" and "externalurl". Of course, at the call site, the reader's custom state contains more columns than these two. Hence the Matches method for SqlDataReader's custom state checks for column subset rather than equality.

Type-specific joins for static values. As mentioned earlier, to pass static approximations of method actuals to plug-in pre- and postconditions, the checker 120 computes a form of constant propagation for values of a few basic types. For all of these types except string if any of the values flowing to a join point is unknown, then the value at the join is unknown. Similarly, if the values are all known but do not have the same value, then the value at the join is unknown. However, for type string are approximated as "strings with holes," a type-specific join operator is used which preserves any common prefix and suffix the incoming string values share. This string specific join operator is useful for checking two of the methods in the case study. Both methods contains code like the following:

```
if (chkSort.Checked)
    select = "SELECT * FROM People " +
        "WHERE FIRSTNAME LIKE " + Filter + " "
else
    select = "SELECT * FROM People " +
        "WHERE LASTNAME LIKE " + Filter + " "
SqlCommand objCommand =
    new SqlCommand(select, objConnect);
```

In this case, the approximation the checker 120 computes at the join point is the array {"SELECT*FROM People WHERE", null, " "}, which is enough information to allow the plug-in postcondition GetColumnInfo to know that all of the columns of table People are being accessed.

Computing connection strings dynamically. In the case study code, the connection strings are not compile-time constants but are computed at run time from the name of the machine running the web site. This setup allows the flexibility to have different connection strings on the development machine, the test machine and the final deployment machine. In this code base, this flexibility was not used, and the connection strings were always computed to be the same value. However, had the strings had different values in the different branches, the value of the connection string at the join would have been the "string with holes"{"Server=", null, "; Database=", null}, which would be useless for checking the code that follows since it does not contain the name of the server or database.

In a situation where an important piece of information has no static value, for example, the connection string in the method

```
public static void Main (string[] args)
{
    SqlConnection = new SqlConnection(args[0]);
``` then a developer can suggest a test value to use for the missing information, as follows:

```
public static void Main (string[] args)
{
    SqlConnection = new SqlConnection(
        Checker.TestScenario(args[0],
        "Server=localhost; Database=Northwind"));
```

The implementation of the static method checker.TestScenario simply returns the value of the first parameter. Hence, at run time, these two version of Main are equivalent. However, during checking, the checker 120 recognizes a call to TestScenario and handles it specially: it sets the type of the result of the method call to the type of the second parameter, which must contain literal information. That is, it treats the call to TestScenario as though it were the literal that is passed as the second parameter. Like testing, TestScenario only allows one value to be tried for the given expression. However, unlike testing, which only executes a single path through the program, the value provided to TestScenario is part of all-paths data flow analysis.

Extensibility of the System 100

In object-oriented libraries, it is not uncommon for an object to be part of a graph of related objects, where a method call on one member graph has side-effects on other members. The graph is called a "collaboration". Rules, like the two side-effect rules mentioned above, can be specified by writing a state-machine protocol for the collaboration as a whole, in addition to the state machine protocols that govern the collaboration's constituent objects. Those skilled in the art will recognize that the system 100 and/or the checker 120 can be employed to extend checking functionality to allow collaboration protocols to be specified and checked.

It is to be appreciated that the system 100, the input component 110, the checker 120, the specification repository 130 and/or the specification extractor 140 can be computer components as that term is defined herein.

While the custom state and plugin pre/post condition(s) have been described with respect to .NET/CLR classes and methods, those skilled in the art will recognize that the custom state and the plugin pre/post conditions can be written in any suitable language. For example, an execution environment for the language will be provided in order to invoke that environment from the system 100, and to marshal custom state(s) back and forth between the system 100 and the other execution environment. In another example, the custom state and plugin/pre/post conditions are available as a service that can be invoked by the system 100 (e.g., via the Internet). Accordingly, the appended claims are intended to include custom state, plugin pre-, and/or plugin post-condition(s) written in any suitable language.

Figure 16:
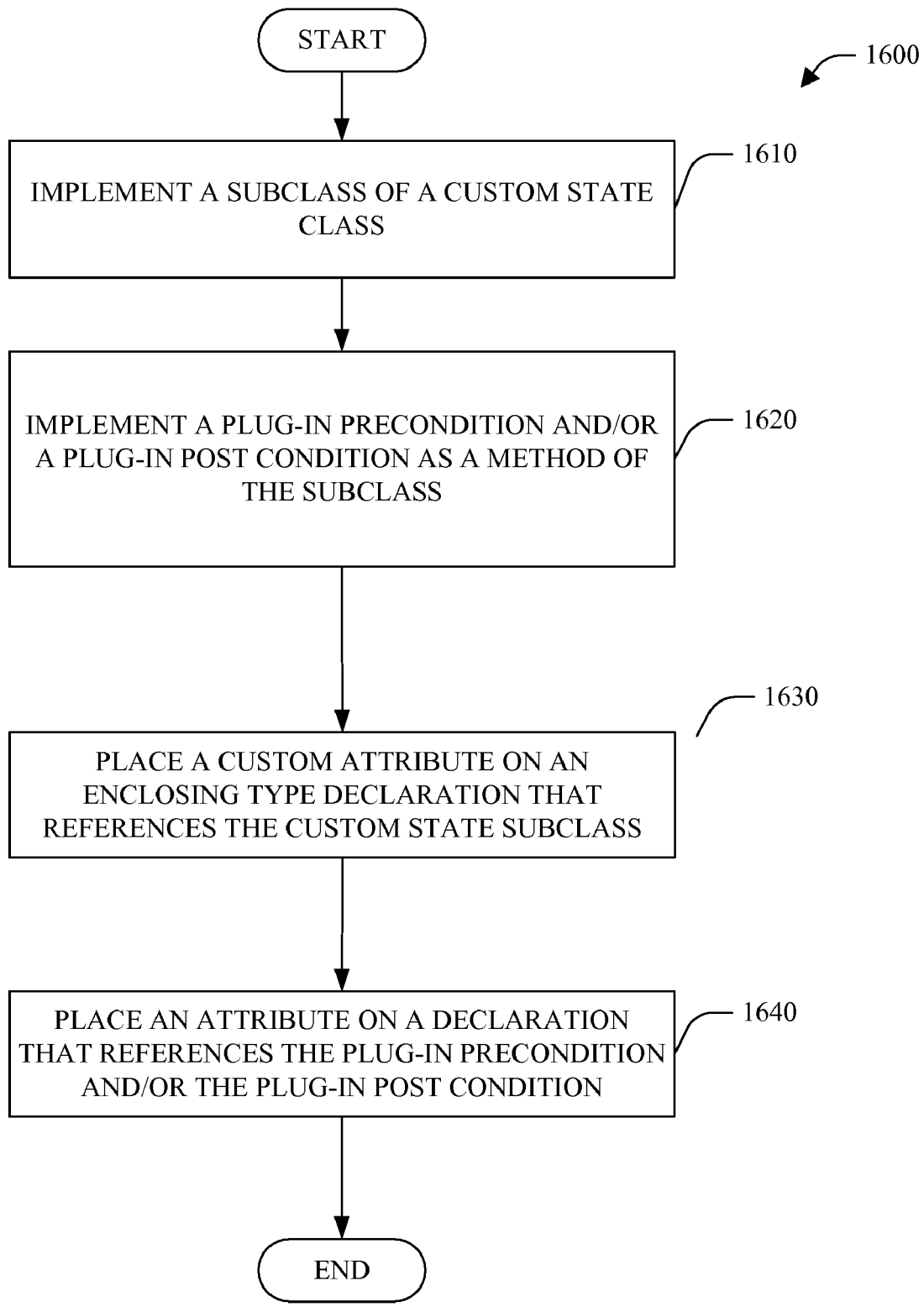
FIG. 16 is a flow chart of a method of developing a software component in accordance with an aspect of the present invention.
Figure 17:
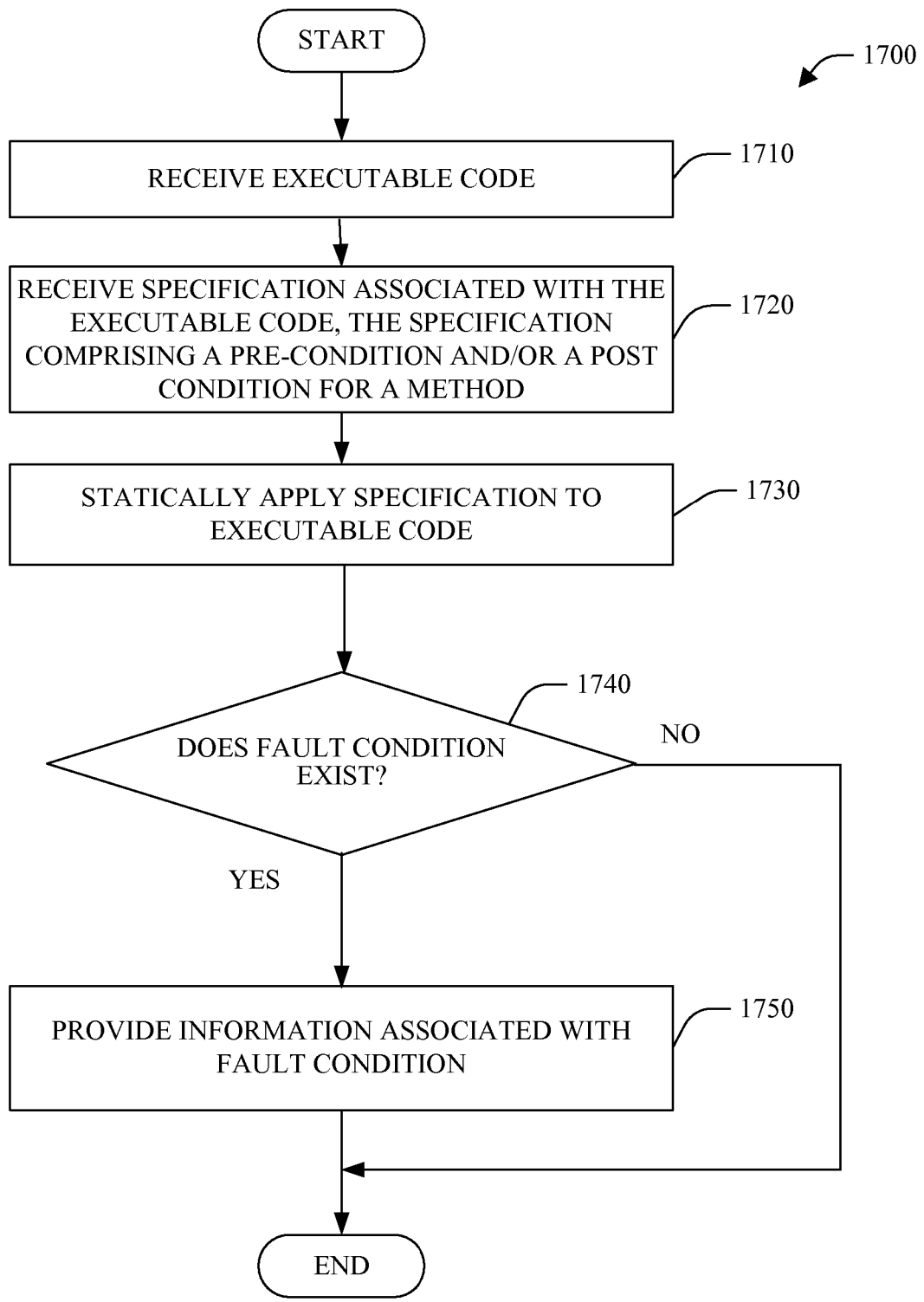
FIG. 17 is a flow chart of a method of facilitating static checking of executable code in accordance with an aspect of the present invention.
Figure 18:
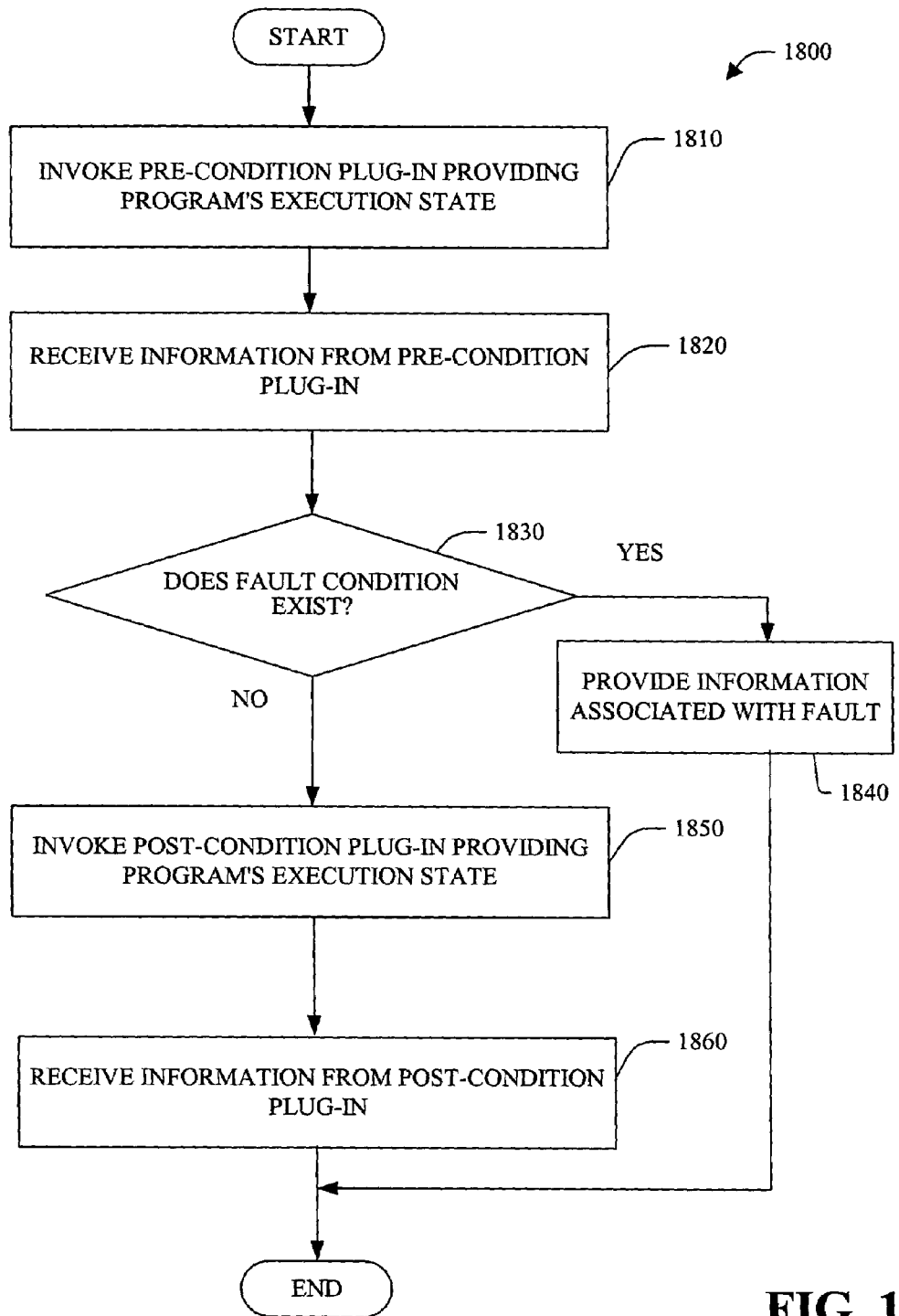
FIG. 18 is a flow chart of a method of performing static checking of executable code in accordance with an aspect of the present invention

Turning briefly to FIGS. 16-18, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 16, a method 1600 of developing a software component in accordance with an aspect of the present invention is illustrated. At 1610, a subclass of a custom state class is implemented. At 1620, a plug-in precondition and/or a plug-in postcondition is implemented as a method of the subclass. At 1630, a custom attribute is placed on an enclosing type declaration that references the custom state subclass. At 1640, an attribute is placed on a declaration that references the plug-in precondition and/or plug-in postcondition.

Turning to FIG. 17, a method 1700 of facilitating static checking of executable code in accordance with an aspect of the present invention is illustrated. At 1710, executable code is received. At 1720, a specification associated with the executable code is received, the specification having a precondition and/or a postcondition for a method. At 1730, the specification is statically applied to the executable code.

At 1740, a determination is made as to whether a fault condition exists based, at least in part, upon the statically applied specification. If the determination at 1740 is NO, no further processing occurs. If the determination at 1740 is YES, at 1750, information associated with the fault condition is provided, and no further processing occurs.

Next, referring to FIG. 18, a method 1800 of performing static checking of executable code in accordance with an aspect of the present invention is illustrated. At 1810, a precondition plug-in is invoked, the plug-in provided with a program's execution state (e.g., approximate execution state). At 1820, information is received from the precondition plug-in. At 1830, a determination is made as to whether a fault condition exists (e.g., based on the information received from the precondition plug-in). If the determination at 1840 is YES, at 1840, information associated with the fault is provided, and, no further processing occurs.

If the determination at 1830 is NO, at 1850, a postcondition plug-in is invoked, the plug-in provided with the program's execution state (e.g., approximate execution state). At 1860, information is received from the postcondition plug-in, and, no further processing occurs.

Figure 19:
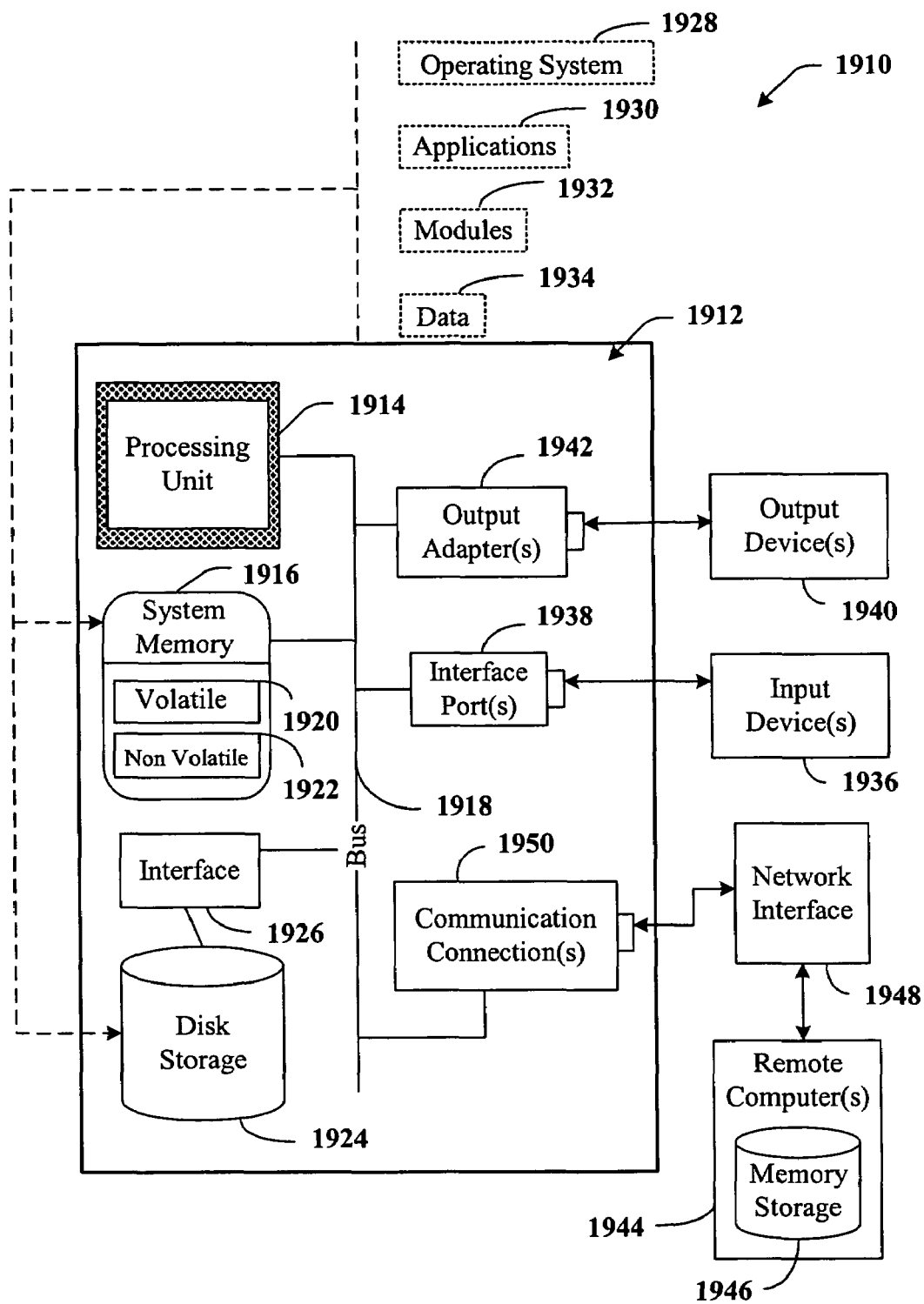
FIG. 19 illustrates an example operating environment in which the present invention may function.

In order to provide additional context for various aspects of the present invention, FIG. 19 and the following discussion are intended to provide a brief, general description of a suitable operating environment 1910 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 19, an exemplary environment 1910 for implementing various aspects of the invention includes a computer 1912. The computer 1912 includes a processing unit 1914, a system memory 1916, and a system bus 1918. The system bus 1918 couples system components including, but not limited to, the system memory 1916 to the processing unit 1914. The processing unit 1914 can be any of various available processors. Dual microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1916 includes volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable ROM (EEPROM), or flash memory. Volatile memory 1920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1912 also includes removable/nonremovable, volatile/nonvolatile computer storage media. FIG. 19 illustrates, for example a disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1924 to the system bus 1918, a removable or non-removable interface is typically used such as interface 1926.

It is to be appreciated that FIG. 19 describes software that acts as an intermediary between users and the basic computer resources described in suitable operating environment 1910. Such software includes an operating system 1928. Operating system 1928, which can be stored on disk storage 1924, acts to control and allocate resources of the computer system 1912. System applications 1930 take advantage of the management of resources by operating system 1928 through program modules 1932 and program data 1934 stored either in system memory 1916 or on disk storage 1924. It is to be appreciated that the present invention can be implemented with various operating systems or combinations of operating systems.

A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port may be used to provide input to computer 1912, and to output information from computer 1912 to an output device 1940. Output adapter 1942 is provided to illustrate that there are some output devices 1940 like monitors, speakers, and printers among other output devices 1940 that require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically includes many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1950 refers to the hardware/software employed to connect the network interface 1948 to the bus 1918. While communication connection 1950 is shown for illustrative clarity inside computer 1912, it can also be external to computer 1912. The hardware/software necessary for connection to the network interface 1948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented executable code check system comprising:
    an input component that receives an object file and a specification associated with the object file, the specification comprising information associated with a plug-in condition for a method, the plug-in condition parses contents of a query string and makes the content available to a checker as part of a program's approximate execution state, the plug-in condition includes a rule for using an interface, system resource management, order of method calls and formatting of string parameters; and,
    the checker that employs the specification to facilitate static checking of the object file, the checker passing a user injected custom state to the plug-in condition to check a fault condition and providing information if the fault condition is determined,
    wherein memory operatively coupled to a processor retains at least a portion of the input component or the checker.

2. The system of claim 1, the plug-in condition comprising a precondition for the method.

3. The system of claim 2, the checker providing information associated with an object's state after a call to the method, the information being based, at least in part, upon the plug-in precondition.

4. The system of claim 1, the plug-in condition comprising a postcondition for the method.

5. The system of claim 4, the checker providing information associated with an object's state after a call to the method, the information being based, at least in part, upon the plug-in postcondition.

6. The system of claim 1, the object file being based, at least in part, upon a language that compiles to Common Language Runtime.

7. The system of claim 1, the object file being based, at least in part, upon at least one of C#, Visual Basic.net and Managed C++.

8. The system of claim 1, the specification comprising information associated with a state-machine protocol.

9. The system of claim 8, a state of an object modeled with a custom state.

10. The system of claim 9, the state of the object further being modeled with a custom state component.

11. The system of claim 10, the specification comprising at least one of a plug-in precondition and a plug-in postcondition method, which is a method of the custom state that is invoked by the checker to perform interface-specific state checks and state transitions.

12. The system of claim 1, wherein the specification is embedded with the object file.

13. The system of claim 1, wherein the specification is stored in a specification repository.

14. The system of claim 1, further comprising a specification extractor that queries a database for its schema and stores information associated with the schema in a specification repository.

15. A method of facilitating static checking of executable code that is at least partially executed by a computer, comprising:
    receiving executable code;
    receiving a specification associated with the executable code, the specification comprising information associated with at least one of a precondition or a postcondition for a method, the at least one of a precondition or a postcondition parses contents of a query string and makes the content available to a checker as part of a program's approximate execution state, the at least one of a precondition or a postcondition includes one or more rules for using an interface, system resource management, order of method calls and formatting of string parameters;

statically applying the specification to the executable code by passing a user injected custom state to the at least one precondition or postcondition;

determining whether a fault condition exists based, at least in part, upon the statically applied specification; and, providing information associated with the fault condition, when a fault condition is determined to exist.

16. A computer readable medium having stored thereon computer executable instructions for carrying out the method of claim 15.

17. A method of developing a software component that is at least partially executed by a computer, comprising:

implementing a subclass of a custom state class;

implementing at least one of a plug-in precondition or a plug-in postcondition as a method of the subclass, the at least one of a plug-in precondition or a plug-in postcondition parses contents of a query string and makes the content available to a checker as part of a program's approximate execution state, the at least one of a plug-in precondition or a plug-in postcondition includes at least one rule for using an interface, system resource management, order of method calls and formatting of string parameters;

placing a custom attribute on an enclosing type declaration that references the custom state subclass;

placing an attribute on a declaration that references the at least one of a plug-in precondition or a plug-in postcondition;

determining a fault condition based in part upon information from the at least one of plug-in precondition or a plug-in postcondition; and providing information associated with the fault condition, when a fault condition is determined to exist.

18. A computer readable medium having stored thereon computer executable instructions for carrying out the method of claim 17.

19. A method of performing static checking of executable code that is at least partially executed by a computer, comprising:

invoking a precondition plug-in that is arbitrary code written by a programmer, the precondition plug-in includes one or more rules for using an interface, system resource management, order of method calls and formatting of string parameters;

providing the precondition plug-in with a program execution state at the call to a method;

receiving information from the precondition plug-in, the precondition plug-in parses contents of a query string and makes the content available to a checker as part of a program's approximate execution state to enable the checker to find defects in the query;

determining whether a fault condition exists based, at least in part, upon the information from the pre-condition plug-in;

providing information associated with the fault condition, when a fault condition is determined to exist; and removing the precondition plug-in from the executable code to reduce the overall physical storage requirements associated with the executable code.

20. The method of claim 19, further comprising at least one of the following:

invoking a postcondition plug-in, providing the postcondition plug-in with the program execution state; and, receiving information from the postcondition plug-in.

21. A computer readable medium storing computer executable components of an executable code check system comprising:

an input component that receives an object file and a specification associated with the object file, the specification comprising information associated with a plug-in condition for a method, the plug-in condition parses contents of a query string and makes the content available to a checker component as part of a program's approximate execution state and the plug-in condition includes a rule for using an interface, system resource management, order of method calls and formatting of string parameters; and, the checker component that employs the specification to facilitate static checking of the object file, the checker component passing a user injected custom state to the plug-in condition to check a fault condition and providing information when the fault condition is determined.

22. A computer implemented executable code check system comprising:

means for receiving a specification associated with an object file, the specification comprising information associated with a plug-in condition for a method, the plug-in condition parses contents of a query string and makes the content available to a checker as part of a program's approximate execution state and includes one or more rules for using an interface, system resource management, order of method calls and formatting of string parameters;

means for statically checking the object file based, at least in part, upon the specification;

means for passing a user injected custom state to the plug-in condition and determining when a fault condition exists; and, means for providing information when a fault condition is determined to exist, wherein a processor operatively coupled to memory executes at least one instruction in relation to at least one of the aforementioned means.

23. A method that is at least partially executed by a computer, of performing static checking of executable codes, comprising:

receiving a request, the request including a parameter;

receiving a plug-in condition that parses contents of a query string and makes the content available to a checker as part of a program's approximate execution state, the plug-in condition includes one or more rules for using an interface, system resource management, order of method calls and formatting of string parameters;

setting a type of a result of a method call to a type of the parameter;

employing the parameter only during static checking of the method;

performing component-wise comparison of a user injected custom state and a state defined by the parameter to determine a fault condition;

providing information associated with the fault condition, when a fault condition is determined to exist.

* * * * *